US006601033B1

(12) United States Patent
Sowinski

(10) Patent No.: US 6,601,033 B1
(45) Date of Patent: Jul. 29, 2003

(54) POLLUTION CREDIT METHOD USING ELECTRONIC NETWORKS

(76) Inventor: Richard F. Sowinski, 996 Arnold Dr., Martinez, CA (US) 94553

( * ) Notice: Subject to any disclaimer, the term of this patent is extended or adjusted under 35 U.S.C. 154(b) by 442 days.

(21) Appl. No.: 09/696,152

(22) Filed: Oct. 24, 2000

(51) Int. Cl.[7] ............................................. G06F 17/60
(52) U.S. Cl. ............................ 705/1; 705/37; 705/52
(58) Field of Search .................... 705/1, 52, 30–32, 705/37; 123/325, 434; 422/900; 110/345; 60/274

(56) References Cited

U.S. PATENT DOCUMENTS 5,873,071 A * 2/1999 Ferstenberg et al. .......... 705/37
6,058,379 A * 5/2000 Odom et al. .................. 705/37
6,338,047 B1 * 1/2002 Wallman ...................... 705/36

FOREIGN PATENT DOCUMENTS

WO  WO 00/43094  * 7/2000

OTHER PUBLICATIONS

Andreoli, Pollution Credits to Get City Bank, Oct. 3, 1994, Crain's Chicago Business, p4, ISSN: 0149–6956.*

* cited by examiner

Primary Examiner—James P. Trammell
Assistant Examiner—Mary Cheung
(74) Attorney, Agent, or Firm—Harold D. Messner

(57) ABSTRACT

The present invention is a method and apparatus for effectuating commerce in claimant-driven individual pollution credits which allows gas utility consumers to claim pollution credit when reducing their pollution levels while employing energy efficiency measures, which has value. Such reduced pollution credit is given value by a third-party, thus, individuals, government agencies and related parties, working in concert with a third-party identify the need, establish ownership, calculate the pollution credit value, and create a new market that has economic value and environmental benefit.

16 Claims, 20 Drawing Sheets

POLLUTION CREDIT METHOD USING ELECTRONIC NETWORKS

SCOPE OF THE INVENTION

There are many individuals, businesses and government agencies striving to attain mandated energy efficiency measures and reduce the pollution levels they generate. Such specialized pollution reduction creates the need for pollution crediting.

For example, new federal laws, building codes, insurance requirements and local building ordinances require all gas pipes must have energy efficiency measures installed, such as a gas filter, or suffer sanctions. Included within these energy efficiency mandates are requirements for reducing pollution, which creates new opportunities for individual pollution credits of the present invention.

Such energy efficiency measures call for the installation and use of a filter on all gas pipes and/or gas appliances. When the individual consumer installs a gas filter within their gas pipes and produces cleaner gas than was previously available, such reduced pollution has value. It's within this gas cleaning and pollution reduction process, which is the basis for this invention that serves a need, provides benefits and has value.

Starting in 1992, Congress, in it's infinite wisdom, began passing energy efficiency laws such as Public Law 101-614 and 101-625 for example, which call for the use of clean energy and energy efficiency measures on all buildings in the nation. And from another direction, the United States Environmental Protection Agency, passing their own clean air standards penalize local governments for non-attainment of their clean air requirements.

As a partial solution to non-attainable clean air levels, regulators have encouraged the development of "pollution-credit offsets" for large industries who generate tons of air pollution each day, which the Chicago Board of Trade trades on a daily basis.

BACKGROUND OF THE INVENTION

1. Field of the Invention.

The method and apparatus of the present invention relate to individual pollution credit development and contract exchanges using electronic networks between pollution credit sellers and buyers. Such method and apparatus provides pollution crediting services to Internet-based sellers and buyers such as individuals, local governmental agencies, utilities and the like where such third parties are provided with pollution credit calculations, ratings, credit transfers, escrow accounts, holding accounts, encryption, security, electronic signature verification ,E:Mailings, and electronic funds transaction by means of an escrow holder who is electronically networked to such parites.

For example, in the first embodiment of the present invention, the escrow holder receives, documents, stores, retrieves, transfers, evaluates, calculates and protects electronically encrypted information relating to energy efficiency measures and pollution reduction claims from individuals, local government agencies, utilities and related parties.

In another embodiment of the present invention, individuals who had previously provided energy efficiency and reduced pollution information to the electronically networked escrow holder, receive a receipt for each information transaction and pollution claim in the form of an individual pollution credit (ipCredit).

In another embodiment of the present invention, because such energy efficiency measures and pollution reductions are subject to interpretation, the escrow holder evaluates such value based on the following criteria: (1) the type of utility sampled by date, location, and duration; (2) laboratory test results of each sample; (3) accurate measurement of the utility submitted; (4) the volume of tested utility being presented for credit; and, (5) the type of energy efficiency measure used to attain the reduced pollution, such value being determined by the escrow holder and is called "individual pollution credit (ipCredit)".

Another embodiment of the present invention, provides a method for an electronically networked escrow holder to transfer the ipCredit, where the former relies upon the information provided by the various parties for accuracy, authenticity, honesty and timeliness.

In another embodiment of the present invention, a business method and apparatus is provided that controls the ipCredit without any of the credit owners feeling poorer for the service, because the owner controls the destiny of his credits.

Another embodiment of the present invention, provides a method and apparatus, whereby once the ipCredit is generated via the electronically networked escrow holder, tends to stay there, and herein lies another embodiment of this business method, the escrow holder calculating pollution credits, identifying ownership, maintaining authority and control over how they are used, in concert with the credit owner. The escrow holder issues credits, provides transfers and depository accounts for ipCredits while providing such escrow services for a fee.

2. Background of the Invention

A portion of the material set forth herein is subject to copyright protection. The copyright owner has no objection to the facsimile reproduction by any one of the patent disclosure, as it appears in the Patent and Trademark Office patent files or records, but otherwise reserves all copyright rights whatsoever.

With the majority of air pollution being produced by individuals, trading in pollution credit offsets is not available to the individual, as is commonly found in industry.

What is needed, is a method that; (1) establishes pollution credit for the individual; (2) provides the means for ascertaining what pollutant is eligible for credit; (3) determines what methods may be used to qualify for claiming a pollution credit; (4) ascribes a value to that pollution credit; (5) determines who wants pollution credits; (6) creates a disinterested third-party judge who can evaluate and ascribe a value for individual pollution credit; (7) determines if there a market that will place a value, in a timely manner to make this method feasible; and (8) determines if there a method and apparatus readily available where individuals can interact with from any location, any time of day or night, in privacy and with security while transacting their pollution credit activities.

For a better understanding of the term "Property rights" reference is made to the following: The Law of Property Rights Protection by Jan G. Laitos, Published 1999, Aspen Law & Business ISBN 0-07-3550152-1

§5.02 Property as a Physical Object or Intangible Interest

The simplest definition of property is one which refers to a tangible thing. Such property typically has physical characteristics and dimensions. It would include both natural resources—land, water, trees, minerals, as well as developed resources—houses, cars, diamond rings.

Property may also be present when the thing has no physical existence, but is instead an intangible legal interest. For constitutional law purposes, the United States Supreme Court and lower courts have found the term "property" sufficiently comprehensive to include an array of intangible interests that (1) may be owned or (2) have value, even though they are not necessarily considered property at common law. These decisions establish that property may exist in a contract. A variety of liens and unsecured claims are considered property deserving a constitutional protection. There may be property in certain private party relationships with private parties, such as with a mortgage, a trade-secret, or a name. There may be property in private party relationships with government, such as when a party has obtained a franchise, or a certain type of license, as well as a government-supplied service. There may also be property in the monetary interest generated from a fund into which a private individual has paid money.

§5.03 Property as the Legal Relationship Between Persons and Things

Another definition of property refers to the set of legal rules governing the relationship between persons with regard to the "things" in the external world. As noted above, these things can be tangible physical property (e.g., land, water, boats, jewelry) or intangible interests (e.g., corporate stock, liens, and government benefits). Under this definition, the property subject to constitutional protection is not the thing with respect to which a person-owner asserts a constitutional defense. Rather, property is the group of rights inhering in the person's relation to the thing.

When property is not the thing itself, but the owner's legal powers over the thing, it is perceived as a bundle of rights. These rights are good against all other people, and they are protected by the Constitution if the government takes, or unreasonably interferes with them. The bundle of rights idea means that each "stick" in the bundle is distinct. The primary rights held by owners are (1) the right to possess, (2) the right to use, (3) the right to manage, (4) the right to the income (the benefits derived from foregoing personal use of a thing and allowing others to use it), (5) the right to the capital (the right to modify or consume it), (6) the right of alienation, (7) the right of transmissibility (the power to devise or bequeath it), and (8) the right to security (immunity from expropriation without compensation.

These rights, particularly the right to use property, are limited by the common law doctrine of sic utere tuo, ut alienum non laedas (use your property so as not to harm another's). The Supreme Court has recently recast the sic utere doctrine, transforming it from a limit on property rights, to a redefinition of what is in the original bundle of rights.

The bundle of sticks model for property was widely adopted throughout the nineteenth and early twentieth centuries. It allowed the Supreme Court to invalidate government actions which interfered with a particular legal right, but not government action that interfered with the physical property. For example, in determining that a statutes took "property" from a holder of a mortgage, the Court identified the relevant property not as the mortgage, but as the right to retain a lien until the indebtedness secured by it is paid. In declaring unconstitutional a state statute that prohibited coal mining which would cause surface subsidence, the Court decided that the applicable property for Takings Clause purposes was not the coal, but the right to mine the support coal. When the Court decided that application of a zoning law had deprived an owner of property under the Due Process Clause, the relevant "property" was not the land, but the owner's right to make practical use of the land, with an adequate return in investment. This rights-driven conception of property was similarly adopted by the first Restatement of Property, . . . which we need not go into here.

POLLUTION CREDITS START LOCALLY

Starting with people who use gas everyday, and filter it before burning, is another basis of the present invention, which requires that gas be sampled, the amount of "banned" chemicals tested and tabulated, with the volume of gas being tested and measured in an acceptable manner, and when these steps are combined, a third-party escrow holder determines the amount of pollution being reduced and calculates an appropriate value for the individual.

Proprietary gas pipe sampling technologies described elsewhere, have been developed that allow the individual gas user to take appropriate samples from inside their gas pipes and/or individual gas appliances as required. These gas samples are tested for hazardous materials so the individual can determine how safe the gas is to burn indoors where people live and work, and determine the amount of pollution being reduced by the process.

Such gas testing, filtering and measurement, coupled with known amounts of gas contaminants which are periodically published by the United States Environmental Protection Agency (EPA) and others, may be used to determine the reduced amount of a pollution when using the methods described herein. By collecting such data, the third party escrow holder is able to ascertain the volume of pollution being reduced by the hour, day, month, etc., and calculates a value.

Such pollution reduction credits are known to have value in various markets, and like industrial pollution offset credits described elsewhere, these ipCredit amounts may be traded, collected, sold, gifted, set-aside, or retained for later use by the owner. Such reduced pollution created by one individual, may be aggregated with other individuals who similarly create pollution reduction credits in varying amounts.

It is this individual and aggregated pollution reducing method, which is another embodiment of the present invention.

INDIVIDUAL POLLUTION CREDITS

In today's economy, pollution credit offsets are openly traded by industry who either need to offset the pollution they generate, or have accumulated more credits than needed. For example, the EPA and the Chicago Board of Trade (CBOT) encourages and supports markets for "pollution-offset"credits, where industry is allowed to "offset" one pollutant for the right to produce another, without penalty during a given time period, or sell the credit, as the case may be.

The present invent and method, improves upon the current industrial pollution offsetting method. For the first time, individuals, who use polluting natural or propane gas have a method, apparatus and means for creating their own pollution credits that have value and broad market applications.

Unlike the referenced industrial pollution offsetting method, the present invention allows individuals to create their own pollution credits, by sampling, testing, filtering, and measuring their gas, and transmitting such information to an electronically networked third party escrow holder for evaluation, credit worthiness and establish a value for their pollution credit.

As the individual consumer reduces air pollution caused by burning contaminated gas, and supported by gas sampling and testing technologies which measures the amount of pollution being reduced, and where such methods allow the individual to accumulate ipCredit which they can, in turn, sell, barter, accumulate, retire, gift, set aside, or invest on an ongoing basis.

How are pollution credits possible? The present invention describes how individual pollution credits are developed, as follows: (1) because the individual is held responsible for using contaminated gas in their operation; and (2) because the individual is responsible for installing energy efficiency measures on their gas pipes; and (3) because the individual is responsible for testing their gas for its contamination levels before burning; and (4) because the individual is required to sample their gas; and (5) because the individual has the gas samples tested to verify its contents; and (6) because the individual has energy efficiency measured installed at their expense to filter-clean their gas; and (7) because the individual properly disposes of the collected gas waste; and (8) because the individual measures the volume of gas being treated and tested; therefore (9) the individual can make a claim for the amount of reduced pollution they achieve; and (10) the individual electronically conveys such information to a third-party escrow holder; and (11) the individual collects pollution credits from the Internet-based electronically networked third-party escrow holder, and does with them as he wishes.

As citizens collectively reduce their natural gas pollution and depending on the desirability of local government agencies to cooperate with its citizenry, some portion of the individual pollution credits may be invested, bartered, gifted, or set-aside to benefit the community by the individual ipCredit owner.

Such beneficial activity by the individual allows a local government to offset, and/or counter-balance air pollution restrictions imposed by Federal and State laws regarding: (1) smog production; (2) acid rain production; (3) greenhouse gas production; (4) ozone depletion; and, (5) pollution which causes global warming. Such beneficial cooperation allows local governments to continue, or renew their participation in Federal and State programs and retain their funding by offsetting and/or counter-balancing clean air and pollution measures where applicable.

BENEFITS OF POLLUTION CREDITING

Many of the benefits available to individuals, government agencies, utilities and related parties using the present invention are mentioned above. In addition, there are the following benefits, where applicable:

One embodiment allows for personal tax credits for the individual when installing and operating energy efficiency measures associated with ipCredits. Examples: seismic and surge shut-off means, filters, leak detectors, automated controllers and, leak-proof valves.

Another embodiment allows for personal tax credits when pollution reducing measures are installed and operational; known as abatement measures associated with ipCredits.

Another embodiment of the present invention, provides for certain tax credits when reducing and/or eliminating certain hazardous and/or toxic chemicals form entering the outdoor air associated with ipCredits.

Another embodiment of the present invention, allows for tax credits when an individual reduces and/or eliminates certain hazardous and/or toxic chemicals form entering the indoor air, such as workplaces associated with ipCredits.

Another embodiment of the present invention, allows for certain tax credits for reducing and/or eliminating certain hazardous and/or toxic chemicals form entering drinking water sources and watersheds associated with ipCredits.

Another embodiment of the present invention, allows building liability insurance rate enhancements associated with the installation and use of energy efficiency compliance equipment associated with ipCredits.

Another embodiment of the present invention, allows building fire insurance rate enhancements associated with the installation and use of energy efficiency compliance equipment associated with ipCredits.

Another embodiment of the present invention, allows for worker compensation insurance rate enhancements related to the use of energy efficiency compliance measures and air pollution reduction methods associated with ipCredits.

Another embodiment of the present invention, allows for health insurance policy rate enhancements related to the use of energy efficiency compliance measures and indoor air pollution reduction methods associated with ipCredits.

Another embodiment of the present invention, allows for utility rebates related to energy efficiency compliance measures associated with ipCredits.

Other embodiments the present invention provides, include, but are not limited to the following forms of physical and/or crediting instruments, such as: coupons, incentives, plans, special fees, discounts, rain-checks, vouchers, cash, checks, certificates, gifts, prizes, awards, rate reductions, rebates, set-asides, offsets, credits, deferred payment, and other such methods typically used in trade and commerce.

POLLUTION CREDIT RATING METHOD

The following "Pollution Credit Rating Method" is a combination of several methods contained in the present invention and preferably uses combinations of the following:

(1) Public Laws, such as 101-614, 101-625; (2) building codes from the National Fire Protection AssociationÕs Standard 80; (3) portions of CaliforniaÕs Proposition 65 pollution prevention law; (4) OSHA's workplace regulations and a host of other codes, laws and regulations, combined with the installation and use of the following energy efficiency measures make up the basis of the Pollution Credit Rating Method employed herein, which include, but are not limited to:

a. Seismic protective measures and seismic gas shut off valves;
b. Gas surge shut off valves;
c. Insitu gas pipe filter and gas appliance filters,.
d. Annual gas valve leak testing as required,
e. Reduction and/or elimination of methane gas leakage,
f. Elimination of continuous burning gas pilot lights,
g. Reduction and/or elimination of Particulate Matter,
h. Reduction and/or elimination of Sulfur Dioxide(SO2),
i. Reduction and/or elimination of Nitrogen Oxide (NOx),
j. Reduction and/or elimination of Carbon Monoxide (CO),
k. Reduction and/or elimination of Total Organic Compounds (TOCs), l. Reduction and/or elimination of Hydrochloric Acid aerosols,.
m. Reduction and/or elimination of Sulfuric Acid aerosols,
n. Reduction and/or elimination of Radon Gas,
o. Reduction and/or elimination of PCBs,
p. Reduction and/or elimination of DIOXINS.
q. Reduction and/or elimination of FURANS, In addition, the following natural gas pollution factors are incorporated in the present invention, which were obtained from the EPA-AP42 publication for boilers and furnaces with input of less than 10 million Btu per hour. The factors represent the weight of a pollutant for each million cubic ft (MMCF) of natural gas input to the process.

| Pollutant | lbs/MMCF Gas Input |
| --- | --- |
| Total Particulate Matter-PM | 12 lb/MMCF |
| Sulfur Dioxide-SO2 | 0.6 lb/MMCF |
| Nitrogen Oxide-NOx | 100 lb/MMCF |
| Carbon Monoxide-CO | 21 lb/MMCF |
| Total Organic Compounds-TOC | 5.8 lb/MMCF |

NOTE:
the average home burns 275 cubic ft of natural gas each month

Which means the typical home burning 275 cubic ft of gas a month produces:

| | |
| --- | --- |
| Total Particulate Matter-PM | 12 lb/MMCF × 275 = .0032 LBS |
| Sulfur Dioxide-SO2 | 0.6 lb/MMCF × 275 = .00017 LBS. |
| Nitrogen Oxide-NOx | 100 lb/MMCF × 275 = .0275 lbs. |
| Carbon Monoxide-CO | 21 lb/MMCF × 275 = .0058 lbs. |
| Total Organic Compounds-TOC | 5.8 lb/MMCF × 275 = .0016 lbs. |

Total .0383 lbs. each month

California Gas Statistics
Pipeline & Gas Journal November 1997 pg. 50
The 300 Leading Gas Distribution Utilities

| Rank | Company | Number of Customers |
| --- | --- | --- |
| 1 | Southern California Gas Co. | 4,789,942 |
| 2 | Pacific Gas & Electric | 3,677,000 |
| 14 | Southwest Gas Corp. | 1,092,489 |
| 24 | San Diego Gas & Electric | 710,927 |
| 72 | Washington Water Power Co. | 229,420 |
| 95 | Long Beach Municipal Gas | 139,085 |
| 158 | Palo Alto Municipal Gas | 23,280 |
| Total Number of California Gas Customers (11/97) | | 9,340,234 |

For example: the nation's largest public utility Pacific Gas and Electric, located in San Francisco, having 3,677,000 home gas customers, discharges 141,700 lbs. of hazardous waste each month into Northern California's indoor and outdoor air, not including PCBs, DIOXINS, FURANS, Radon or Acid aerosols.

Further, California gas utilities 9,340,234 gas customers produce an estimated 357,722 lbs. of hazardous waste each month. Actually these figures only reflect half of the natural gas sold by the utilities, the other half of the market is commercial, industrial and electric generation and is not included. Natural gas statistics only report residential gas volumes. More accurately, one can estimate California gas utilities dump 715,444 lbs of hazardous waste into the air every month.

The "Gas Facts Handbook" published by the American Gas Association, reports that 1,450 quadrillion cubic ft of gas was sold in the U.S. in 1993. Quadrillion (as in million)—quadrillion is 1 followed by 24 zeros, viz., 1,450,000,000,000,000,000,000,000,000 cubic ft of gas Therefore 1,450,000,000,000,000,000,000,000,000 cubic ft of gas is burned in the United States every year.

MEANING, 290,000,000,000,000,000 tons of hazardous waste spew into the indoor and outdoor air every year.

Natural gas is one of the major contributors of acid rain, smog production, ozone depletion, greenhouse gas production and global warming and any improvement will be a benefit.

The following "Energy Efficiency Credit Rating Method" is a combination of several methods contained within the present invention and preferably uses, in addition to the aforementioned methods of the "Energy Efficiency Credit Rating Method",the volume of gas measured in cubic ft, and the amount of reduced pollutant, measured by weight in pounds (16 ounces), are included.

As more individuals determine the amount of contamination they can band together and bring their findings to local government officials to demand necessary changes be instituted immediately, as prescribed by various Public Laws: Public Law 101-625, 104 Stat. 4079—to make recommendation on financing energy efficiency in private mortgages, through the policies of Federal agencies and federally chartered financial institutions, mortgage bankers, home builders, real estate brokers, private mortgage insurers, energy suppliers, and nonprofit housing and energy organizations. The task force shall include individuals representing the Federal Housing Administration mortgage . . .

SEC. 203. "42 USC 12722" PURPOSES.—purposes of this title are—(1) to expand the supply of decent, safe, sanitary, and affordable housing, with primary attention to rental housing, for very low-income and low-income Americans; (2) to mobilize and s strengthen the abilities of States and units of general local government throughout the United States to design and implement strategies for achieving an adequate supply of decent, safe, sanitary, and affordable housing; . . . (8) to increase the investment of private capital and the use of private sector resources in the provision of decent, safe, sanitary, and affordable housing . . .

Public Law 101-614, 104 Stat. 3231 An act to authorize appropriations for the Earthquake Hazards Reduction Act of 1977, and for other purposes. Be it enacted by the Senate and House of Representatives of the United States of America in Congress assembled, SHORT TITLE SECTION 1. This Act may be cited as the "National Earthquake Hazards Reduction Program Reauthorization Act," 42 USC 7701.

SUMMARY OF THE INVENTION

In a preferred embodiment, the present invention provides a method and apparatus for prospective individual utility consumers ("seller"), claiming individual pollution credit ("ipCredit"), while seeking various buyers ("buyer"), with the aid of a third party escrow holder to evaluate their energy efficiency measures and pollution reduction activities to be converted into a form of conditional pollution reduction credit ("CPRC"), which creates value and a global market. In some situations, for example, the seller of an ipCredits may not be related to government requirements, while in others, they might provide an important part of a governmental operations.

Additionally, the present invention can effectuate performance of an agreement between seller and buyer to trade, invest, barter, credit, gift, collect, sell, transfer, exchange, offset, counter-balance, and/or set-aside such ipCredit among one and another. The present invention is therefore an effective multi-level, bilateral system of commerce for individual pollution credit, which provides the seller with the ability to create ipCredits and comply with energy efficiency and pollution reduction laws, while helping a buyer meet their Federal and State clean air requirements.

For example, California's Safe Drinking Water and Toxic Enforcement Act of 1986, commonly referred to as Proposition 65, requires businesses using natural gas in their operations to post public warning placards. For example, OSHA recently adopted California's Proposition 65 to protect workers across the nation. For example, energy efficiency measures must be installed as per Public Law 101-625; this Act "42 USC 12701" may be cited as the "Cranston-Gonzalez National Affordable Housing Act." For example, seismic gas shut off requirements are required under Public Law 101-614; this Act may be cited as the "National Earthquake Hazards Reduction Program Reauthorization Act," "42 USC 7701". For example, gas surge shut off requirements are codified by the Department of Transportation (DOT, and the National Fire Protection Association (NFPA) Standard 80 building codes issued in 1996, which includes these requirements. It is from within these laws that individual pollution credits, may be claimed by the individual utility consumer.

For example, government agencies both large and small across the nation face clean air demands from EPA, which enforces the Clean Air Act Amendment, the Smog Reduction Act, the Acid Rain Reduction Act, the Ozone Protection Act, the Greenhouse Gas Reduction Amendment, and the Kyoto Global Warming Reduction protocols. Local governments are being penalized for non-attainment of their Smog levels, etc., by loss of Federal funds, loss of access to any future Federal funds, loss of participation in any future Federal programs, etc.

In one embodiment, communications between seller and buyer is conducted using an electronic network and central controller. A seller who wishes to be provided with pollution reduction credits, accesses the central controller located at a remote server. The program within the central controller allows the seller to claim a conditional pollution reduction credit ("CPRC") by; (1) specifying the basis of the energy efficiency method employed; (2) the type of pollutant being reduced; (3) testing results (before and after filtration values by amounts versus the time duration for each); (4) whether a CPRC, or a combination of CPRCs is being offered; and (5) any other conditions required. For example, a typical CPRC could specify that the seller used a required energy efficiency gas filter to reduce Nitrogen Oxide (NOx) levels, which qualifies him for ipCredit and he wants to register the credits and deposit them in his personal account within the central controller.

The seller attaches a user identification to the CPRC and transmits the CPRC to the central controller. Within the present invention, the CPRC may be transmitted via numerous means including a Internet electronic interface, electronic mail, voice mail, facsimile, or postal mail. Standard legal provisions and language are then integrated with the CPRC to effectuate an ipCredit and/or Credit contract by the buyer. Alternatively, the CPRC may be electronically developed while the buyer is on-line with the central controller.

Before communicating the CPRC to a potential buyer, the program of the central controller authenticates the buyers identification number against a buyer database. The central controller may require the buyer provide a credit card number and may also ensure that the buyer has sufficient credit available to cover the cost of filing an CPRC by contacting the credit card clearinghouse. The central controller then assigns a unique tracking number to the CPRC and globally displays the CPRC in a manner such that it is available to be viewed by any potential seller, if the buyer so desires.

CPRCs may be displayed by subject category to make it easier for potential buyers to identify relevant CPRCs. Thus a buyer could log onto a Website, for example, and see a listing of CPRC subject categories. The buyer could then choose a particular subject and have the ability to browse CPRCs which correspond to that subject category. In one embodiment, the buyer may be required to provide qualifications in order to view the CPRCs of a given category.

If, after reviewing a particular CPRC, a potential buyer wishes to accept the CPRC, the buyer communicates their intent to the program within the central controller. The central controller then time-stamps the message from the buyer and authenticates the identity of the buyer and the buyerÕs capacity to respond to the requirements of the seller. The system then verifies that the particular CPRC is still active and capable of being accepted. If a CPRC is capable of being accepted by only one buyer, it is completed when the first qualified buyer accepts it. Subsequent buyers will not be able to accept a completed CPRC. If a buyer accepts an active CPRC, a unique tracking number is assigned to the buyer indicating acceptance. The acceptance is then stored in a "accepted CPRC" database. The buyer and seller are now related parties to a legally binding contract.

In another embodiment, the program in the central controller manages the payment transferal system between the seller, the buyer and electronic hosting system automatically. Various methods of payment may be utilized by the invention, including credit cards, personal checks, electronic funds transfer, debit cards, smart cards, digital checks, and digital cash. The payment system may also involve the use of an escrow account associated with the seller or buyer wherein finds advanced by the seller or buyer cover the work related to filing an ipCredits which can be kept pending acceptance by a qualified buyer. Additionally, the timing of payment to the seller can be varied. The seller can be paid immediately after accepting a CPRC or payment can be delayed until after the seller or buyer performs their obligations under the contract.

In another embodiment of the present invention, a buyer is given the option to respond to a CPRC by issuing a binding "counter-offer" with conditions different from the original CPRC. The buyer transmits the counteroffer to the central controller which then forwards the counteroffer to the seller. The seller is then given the option of accepting the counter-offer and thereby binding the buyer to a contract.

The present invention can also be practiced in off-line embodiments. Instead of using electronic mail or Web-based servers, seller and buyer may communicate with the program of the central controller via telephone, facsimile, post mail or other off-line methods. For example, seller and buyer may use telephones to create CPRCs, with or without the assistance of a live agent and seller and buyer wishing to enter their energy efficiency and pollution reducing claims may use a telephone to also browse and/or bind CPRCs as the case may be.

In another embodiment, cryptographic protocols are used to authenticate the identity of the seller and buyer and verify the integrity of the seller and buyer communications with the central controller. Using cryptography and biometrics, the central controller can make it significantly more difficult for unauthorized persons to tamper with the system by passing themselves off as legitimate seller and buyer or eavesdropping on system communications.

Anonymity is another advantage of the present invention. For numerous privacy and competitive reasons sellers and buyers prefer not to have their identities revealed to the general public when engaging in energy efficiency and pollution credit transactions. The present invention effectuates the anonymity of seller and buyer through the use of identification numbers stored in a seller and buyer database secured by the central controller.

In one embodiment, the program of the present invention divides the functionality of the central controller into four components and embodies them in four servers: (1) an operations server; (2) a trusted server; (3) a ipCredits calculator; and (4) a bonding agent. The trusted server authenticates the identity of the seller and buyer while the bonding agent verifies their ability to pay the Web-based servers for services rendered. The ipCredits calculator develops the credit worthiness of individual pollution credit claims and assigns each of them a value based on certain criteria. The operations server posts the CPRC, relying upon messages from the other three servers for validation. This configuration allows for greater specialization of the servers.

Finally, an embodiment of the present invention includes a mechanism for resolving disputes between seller and buyer arising out of agreements consummated while using the system. The related parties may be required in CPRCs to stipulate to binding arbitration and may be assisted in the arbitration process by the central controller. The central controller may serve as an arbitrator or may refer the dispute to a third-party arbitrator for resolution.

What the present invention accomplishes, which no previous system has ever done before, is to empower the individual utility consumer in such a manner that allows the individual to be in control of their ipCredits, while using a third-party arbitrator.

Attached to the each CPRC are details describing what the seller and buyer must agree to in order for the ipCredit to enter the market place as a CPRC. There is no uncertainty or waste of time on the part of the seller. He knows that if he meets the conditions set forth by the regulations for reducing pollution levels, he can immediately close the claim for credit and be compensated for it once the buyer binds.

The invention also allows the buyer to reach a larger number of pollution credit sellers who normally would not be able to find one and another, but who my be able to provide the buyer with the exact ipCredit the buyer requires. For instance, this might be the case for a natural gas consumer (seller), who can define the energy efficiency measures used to reduce a variety of natural gas pollutants by a certain value and wagers those pollution credits on the open market, for all potential buyers.

In one embodiment of this invention, the individual ipCredits owner may trade, credit, invest, gift, collect, sell, transfer, exchange, offset, and/or set-aside his pollution credits with a potential buyer. The present invention allows such a seller to issue a binding ipCredit offer which is globally communicated to potential buyers. Any one of these buyers could then decide whether or not to accept the pollution credit offer. The seller's advantage is particularly significant when pollution credits sought by buyers are impossible to come by and potentially, the seller will find buyers who need to offset or counter-balance their clean air requirements while providing seller with the desired reward.

It is a goal of the present invention to provide a robust system which matches banned pollution chemicals, with seller ipCredits, which can be used by buyers to satisfy their pollution offsetting needs. The invention provides a global, bilateral, pollution credit system for creating binding contracts incorporating various methods of communication, commerce and security for buyer and seller. The power of a central controller to field binding offers from buyers, communicate those offers globally in a format which can be efficiently accessed and analyzed by potential sellers, effectuate performance of resulting pollution credit contracts, resolve disputes arising from such contracts, and maintain billing, collection, authentication and anonymity, which makes the present invention an improvement over the non-existence of such methods.

PREFERRED EMBODIMENTS OF THE INVENTION

Figure 1:
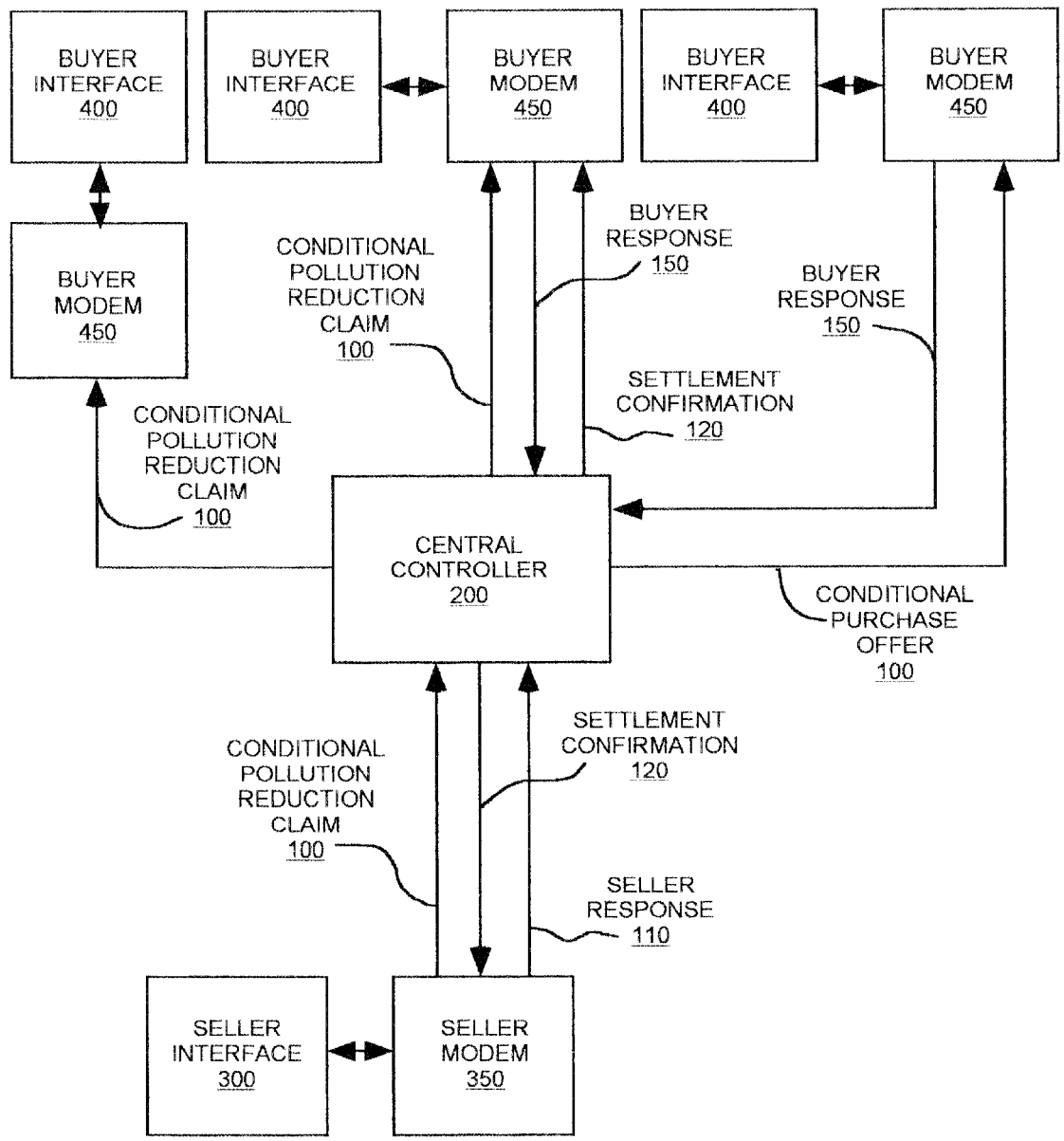
FIG. 1 illustrates a first embodiment of the present invention.

Preferably using electronic and encryption methods designed to function both on and off the World Wide Web and the Internet electronic apparatus, with help from a third-party, that serves a Web-based server function designed to provide a type of hosting portal access for individuals, government agencies, utilities and related aprties seeking to participate in pollution credit related activities.

Another embodiment of the present invention, provides the individual with access to electronic and encryption methods as the basis of the present invention. The individual residing or doing business within a local government agency, takes steps to monitor, inspect, sample, test and measure their gas for it's contents before burning indoors. And the individual may electronically transmit, display, and/or report their individual gas test results and pollution reductions as information to be freely shared with others for reference and comparison purposes, or not, as the case may be.

Another embodiment of the present invention, includes individual natural and propane gas users, such as homeowners, building owners, tenants, renters, lessors, small businesses, commercial enterprises, industrial facilities, corporations, partnerships, trusts, REITs, nonprofit organizations, fiduciaries, military establishments, government building owners, government lessors, government tenants, etc., as defined elsewhere.

In another embodiment of the present invention, if the individual determines their gas contents poses a threat to their person and/or property, the individual electronically, or in person, joins with other individuals having obtained similar gas test results within a local government jurisdiction, wherein individuals electronically come together forming an aggregate group using these preferred electronic and encryption methods and apparatus described in the present invention and post their information on a specialized Internet Web-based server in a secure, or public form, as the individual so chooses.

Another embodiment of the present invention, provides a method for an electronically encrypted aggregation of individual gas consumers, coming together and present their gas test results to the local government agency having such jurisdiction and demand such gas contamination occurring in the local government agency's jurisdiction be stopped, corrected and that compliance measures be installed, and compensation made available to the damaged individuals and the aggregate community within the local government agency's jurisdiction.

Another embodiment, provides for the aggregation of government agencies having direct jurisdiction over such air pollution regulations and administration which includes, but is not limited to: (1) local municipal governments; (2) county boards of supervisors; (3) state government agencies; (4) state and regional air resources boards; (5) state and federal air quality control districts; (6) special regional air quality control districts, and the such.

Whereas such gas contamination and air pollution corrective and remedial measures are codified in various laws and regulations, and are available from a the preferred Internet Web site third-party, in a public or secure electronic encrypted manner, as required.

In another embodiment of the present invention, where such an electronic and encrypted aggregation of information, laws, regulations, codes, ordinances, compliance measures, equipment sources, funding sources and the like, provide the individual with sufficient information to make an informed decision and electronically determine the fate of their ipCredit while taking appropriate action described elsewhere.

In another embodiment of the present invention, the method and apparatus can be equally applied to the electronic methods found on the World Wide Web and the Internet, including facsimile, telephony, voice and wireless transmission, or applied to convention information transmission methods such as U.S. Postal Service, courier service, and person-to-person.

In another embodiment of the present invention, provides for individuals and local government usage, relating to various business applications and legal procedures such as civil, criminal, contract, business, Uniform Commercial Code, procedural, RICO, small claims law and arbitration procedures as they might apply.

DETAILED DESCRIPTION

The method and apparatus of the present invention is described as follows with reference to FIGS. 1, 2 3, and 4. In a preferred embodiment, the present invention includes a central controller 300, seller interface 300, buyer interface 400, and associated databases. The present invention receives conditional energy efficiency and pollution reducing information from seller, and allows buyer to bind them. Thus, a seller is able to communicate his conditions to follow through to a buyer to acquire seller's ipCredit, giving the buyer confidence that if he can provide the ipCredits, and the buyer has the ability to comply with the seller's requirements.

System Architecture

The system architecture of a first embodiment of the apparatus and method of the present invention is illustrated in FIGS. 1 through 4.

As shown in FIG. 1, the apparatus of the present invention comprises seller interface 300, central controller 200, and buyer interface 400 (collectively the "nodes"). Each node is connected via an Internet connection using a public switched phone network, such as those provided by a local or regional telephone operating company. Connection may also be provided by dedicated data lines, cellular telephony, Personal Communication Systems ("PCS"), Personal Data Systems (PDAs), pagers, microwave or satellite networks. Seller interface 300 and buyer interface 400 are the input and output gateways for communications with central controller 200.

Using the above components, the present invention provides a method and apparatus for an individual with ipCredit to post a conditional pollution reduction credit ("CPRC") and make them available to a potential buyer and to bind the CPRC to form a legally binding contract.

Figure 2:
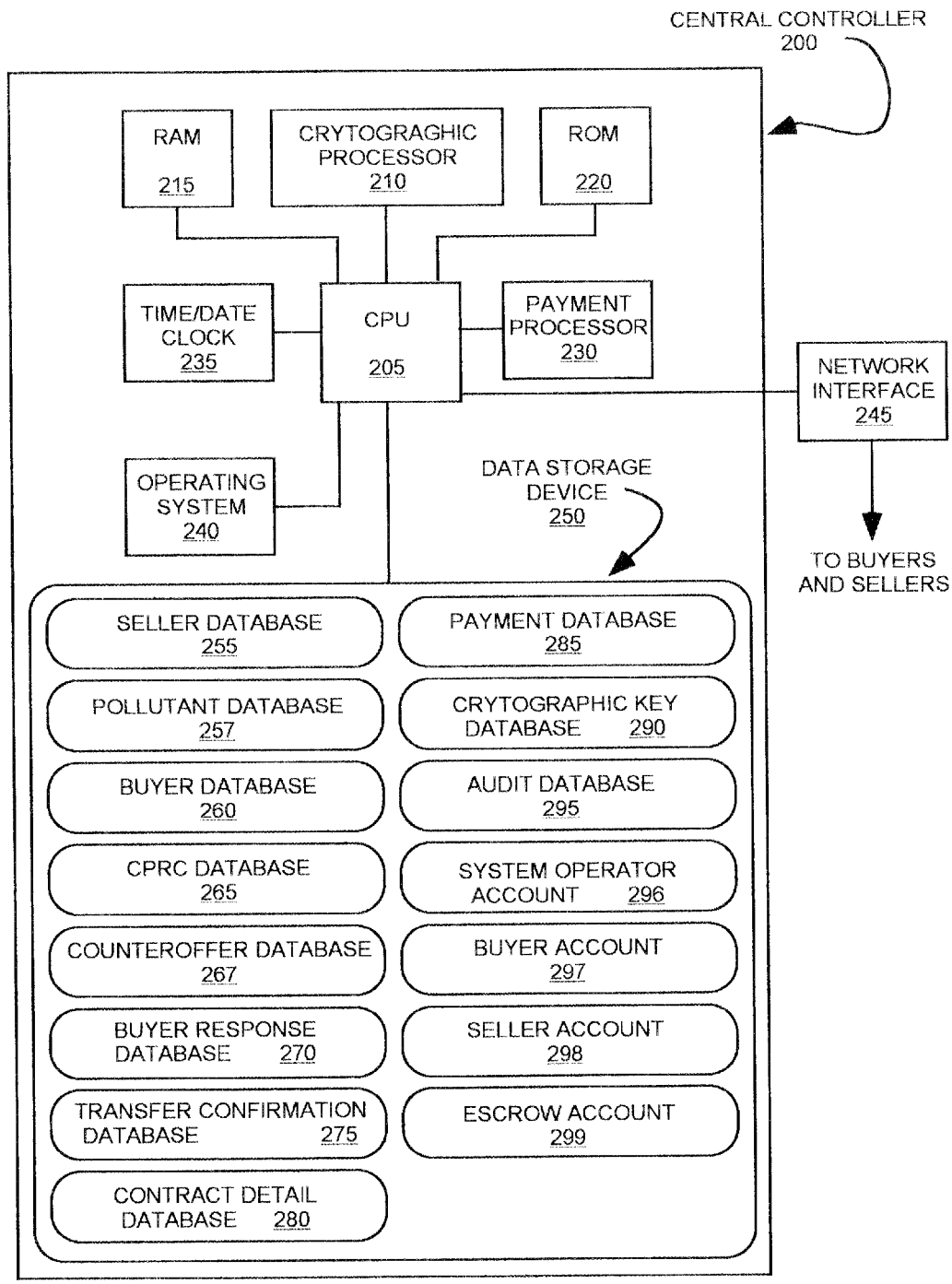
FIG. 2 is a block diagram showing one embodiment of the central controller.

As shown in FIG. 2, central controller 200 includes central processor (CPU) 205, cryptographic processor 210, RAM 215, ROM 220, payment processor 230, clock 235, operating system 240, network interface 245, and data storage device 250.

A conventional personal computer or computer workstation with sufficient memory and processing capability may be used as a central controller 200. In one embodiment it operates as a web server, both receiving and transmitting CPRCs 100 generated by seller. Central controller 200 must be capable of significant number of mathematical calculations in processing communications and database searches. A Pentium microprocessor operating at 500 MHz, commonly manufactured by Intel, Inc., may be used for CPU 205. This processor employs a 64-bit architecture. Equivalent processors include the Motorola 500 MHz Power PC or Sun Microsystems 750 MHz UltraSPARCIII.

One or more conventional microcontrollers may be used for cryptographic processor 210. Equivalent processors may also be used. Cryptographic processor 210 supports the authentication of communications from both seller and buyer. Cryptographic processor 210 may also be configured as part of CPU 205.

Referring again to FIG. 2, payment processor 230 comprises one or more conventional microprocessors, such as the Intel Pentium, supporting the transfer and exchange of settlements, payments, charges, or debits, attendant to the method of the apparatus. Payment processor 230 may also be configured as part of CPU 205. Processing of credit card transactions by payment processor 230 may be supported with commercially available software. The practice of processing credit card transactions to effect payment is well known in the art and need not be described here in detail. For instance, processing credit card transactions include on-line account statements, order-taking and credit card payment authorization, credit card settlement, automated sales tax calculations, digital receipt generation, account-based settlement tracking, and payment aggregation for low-priced services.

Data storage device 250 includes hard disk, magnetic, or optical storage units, as well as CD-ROM drives or flash memory. Data storage device 250 contains databases used in the processing of transactions including seller database 255, pollutant data base 57, buyer database 260, CPRC database 265, counteroffer database 267, buyer response database 270, transfer confirmation database 275, contract detail database 280, payment database 285, cryptographic key database 290, and audit database 295. In a preferred embodiment database software such as Oracle8, manufactured by Oracle Corporation is used to create and manage these databases. Data storage device 250 also stores information pertaining to system operator account 296, buyer account 297, and seller account 298, and escrow account 299.

Buyer database 260 maintains data on buyer with files such as name, contact information, address, credit card number, phone number, ID number, Employer Tax ID number, electronic mail address, credit history, past system usage, public/private key information, payment preferences, type of buyer, etc. This information is obtained when the buyer registers with the system, or immediately prior to posting their first CPRC 100. buyer database 260 also contains the tracking number of each CPRC 100 generated by the buyer, and the tracking number of each seller response 110 and counteroffer 140 directed to the buyer's CPRCs 100.

Seller database 255 maintains data on seller with fields such as name, contact information, address, credit card number, social security number, phone number, seller ID number, electronic mail address, credit history, past system usage, public/private key information, type of business, Employer Tax ID number, etc. Contact information comprises a phone number, web page URL, bulletin board address, pager number, telephone number, electronic mail address, voice mail, facsimile number, or any other way to contact the seller. Upon registration, the seller may be required to demonstrate evidence of ability to deliver on bound CPRCs 100. A seller, for example, might submit a pollution reduction credit created when the seller tested his gas, filtered the gas and demonstrated a reduction of a gas pollutant, which the seller offers to potential buyers so that central controller 200 can quickly determine whether the seller or aggregation of sellers is capable of satisfying a given CPRC 100 from a buyer.

CPRC database 265 tracks all CPRCs 100 with fields such as status, tracking number, date, time, subject, ipCredit index, expiration date, conditions, and buyer ID number. This database is valuable in the event disputes between buyer and seller regarding credit settlement, because details of the contract can be produced, CPRC database 265 may also store bond certificate 172.

Counteroffer database 267 tracks all counteroffers 140. The structure of this database is identical to CPRC database 265, except for the addition of a field for CPRC tracking number which allows counteroffer 140 to be correlated with a particular CPRC 100.

Buyer response database 270 tracks all buyer responses 150 with fields such as buyer name, buyer ID number, date, time, buyer tracking number, and associated CPRC tracking number.

Transfer confirmation database 275 tracks the messages sent to the buyer confirming completed transactions, such as bound contracts. Fields include buyer name, buyer ID number, seller name, seller ID number, credit confirmation tracking number, and associated CPRC tracking number.

Contract detail database 280 contains form background provisions for inclusion in CPRCs 100. These form provisions effectively fill the gaps between conditions specified by the seller, specifying the contract details common to this form of CPRC 100.

Settlement database 285 tracks all settlements made by the buyer with fields such as buyer name, buyer ID number, Claimant's ID Number, type of settlement, and associated CPRC tracking number. This database may also store credit card numbers of buyer and seller.

Cryptographic key database 290 facilitates cryptographic functions, storing both symmetric and asymmetric keys. These keys are used by cryptographic processor 210 for encrypting and decrypting CPRCs 100, seller responses 110, settlement confirmations 120, counteroffers 140, and buyer responses 150.

Audit database 295 stores transactional information relating to the posting of CPRCs 100, allowing it to be retrieved for later analysis.

Buyer account 297 tracks all information pertaining to the buyer's account number, and debit or credit transactions. This account may be a pointer to account data stored at the buyer's bank.

Seller account 298 tracks all information pertaining to the seller's account with fields such as seller's name, bank and credit account numbers, and debit or credit transactions. Buyer settlements for CPRCs 100 may be sent to this account.

Escrow account 299 is an account which temporarily holds buyer settlements before they are placed in seller account 298.

Network interface 245 is the gateway to communicate with buyer and seller through respective buyer interfaces 400 and seller interface 300. Conventional internal or external modems may serve as network interface 245. Network interface 245 supports modems at a range of baud rates from 1200 upward, but may combine such inputs into a T1, T3 or DSL line if more bandwidth is required. In a preferred embodiment, network interface 245 is connected with the Internet and/or any of the commercial on-line services such as America Online, Internet Explorer, or Compuserve, allowing buyer and seller access from a wide range of on-line connections. The practice of using commercial electronic mail servers is well known in the art and need not be described here in detail. For instance, such secure server-based electronic mail software package designed to link people and information over enterprise networks and the Internet are widely available. These products are not platform dependent and utilize open standards based on Internet protocols. Users can exchange messages with enclosure such as files.

While the above embodiment describes a single computer acting as a central controller 200, those skilled in the art will realize that the functionality can be distributed over a plurality of computers. In the embodiment, central controller 200 is configured in a distributed architecture, wherein the database and processor are housed in separate units or locations. Some controllers perform the primary processing functions and contain a minimum of RAM, ROM and a general processor. Each of these controllers is attached to a Wide Area Network (OWANÓ) hub which serves as the primary communication link with the other controllers and interface devices. The WAN hub may have minimal processing capability itself. Those skilled in the art will appreciate that an almost unlimited number of controllers may be supported. This arrangement yields a more dynamic and flexible system, less prone to catastrophic hardware failures affecting the entire system. The trusted server embodiment provides more details as such a distributed environment, describing operations server 160, trusted server 165, bonding agent 170, and ipCredits calculator 175. The hardware of these servers would be configured similarly to that described for central controller 200.

In another embodiment of the present invention, ipCredits calculator 175 calculates the value for each CPRC 100. In this embodiment, ipCredit calculator 175 may be distributed over a number of servers using database software protocols, spreadsheet software protocols, and XML (Extensible Markup Language), which allows one entry to simultaneously be entered into all related databases, spreadsheets, tables, charts and documents operating within the system.

Figure 3:
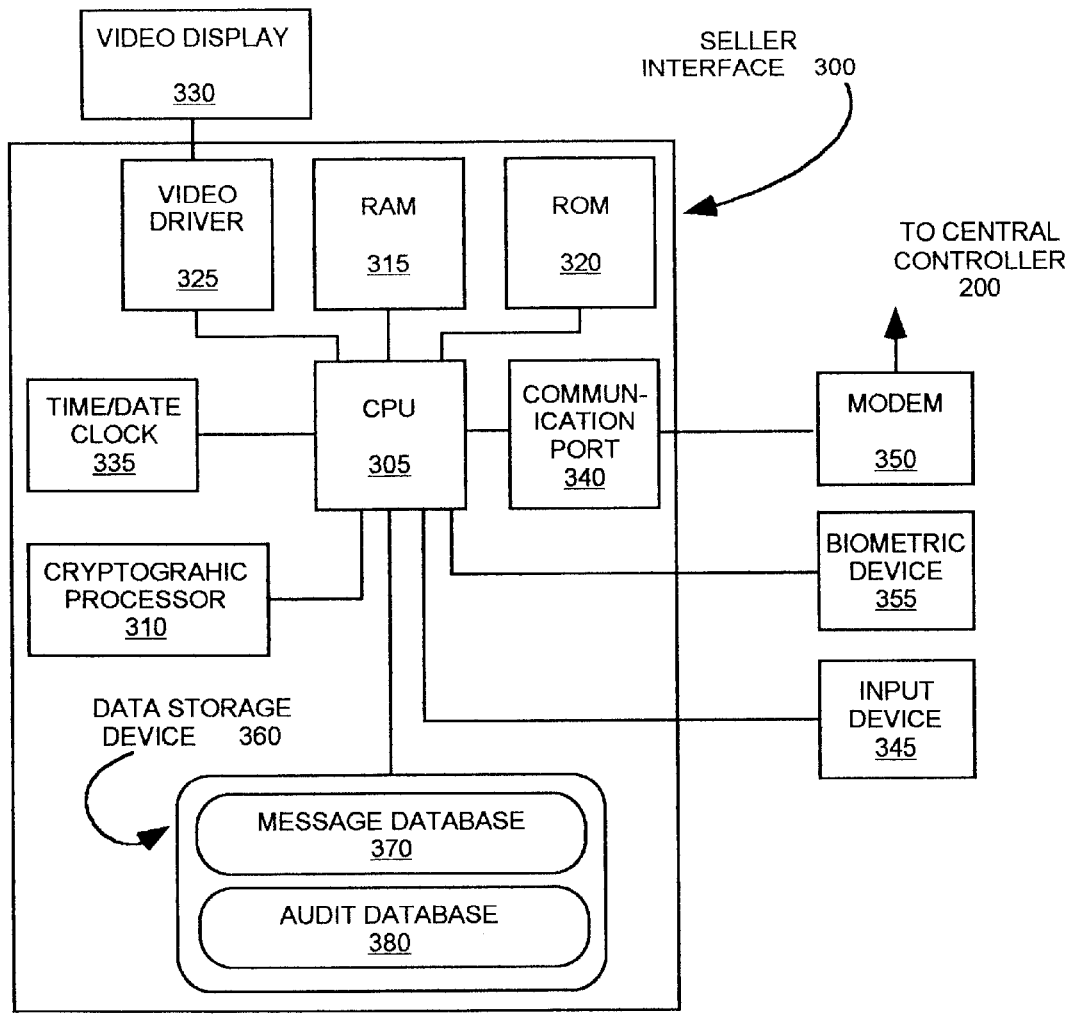
FIG. 3 is a block diagram showing one embodiment of the seller interface.
Figure 4:
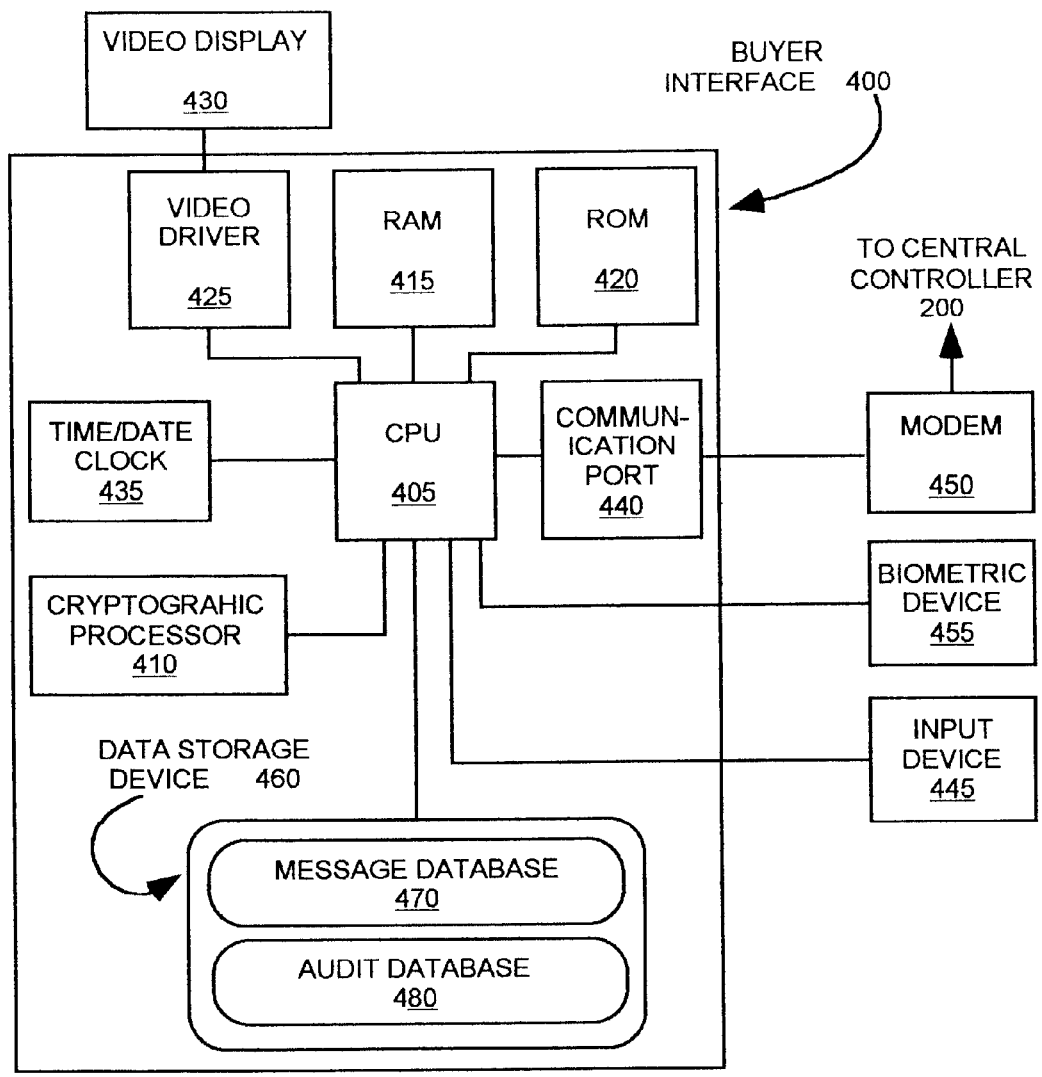
FIG. 4 is a block diagram showing one embodiment of the buyer interface.

FIGS. 3 and 4 describe individual seller interface 300 and buyer interface 400, respectively. In an exemplary embodiment they are both conventional personal computers having an input device, such as a keyboard, mouse, microphone, or conventional voice recognition software package; a display device, such a video monitor; a processing device such as a CPU; and a network interface such as a modem. These devices interface with central controller 200. Alternatively, seller interface 300 and buyer interface 400 may also be voice mail systems, or electronic or voice communications systems. As will be described further in the following embodiments, devices such as fax machines, pagers and PDAs are also suitable interface devices.

Referring now to FIG. 3, there is described seller interface 300 which includes central processor (CPU) 305, cryptographic processor 310, RAM 315, ROM 320, video driver 325, video monitor 330, time date clock 335, communications port 340, input device 345, modem 350, and data storage device 360. Cryptographic processor 335 and biometric device 355 may be added for stronger authentication as described later. A Pentium microprocessor such as the 500 MHz Intel models described above may be used for CPU 305. Clock 335 is a standard chip-based clock which can serve to timestamp seller response 110 or counteroffer 140 produced with seller interface 300.

Modem 350 may not require high-speed data transfer if most individual seller responses 110 and counteroffers 140 produced are text-based and not too long. If a cryptographic processor is required, the system operator has several microcontroller choices available, which are well known in the art and need not be described here in detail. The structure of biometric device 355 will be described below in conjunction with the cryptographic authentication embodiment.

Data storage device 360 is a conventional magnetic-based hard disk storage unit such as those manufactured by Conner Peripherals. Message database 370 may be used for achieving seller responses 110 and counteroffers 140, while audit database 380 may be used for recording payment records and communications with central controller 200.

Referring now to FIG. 4, there is described buyer interface 400 which includes central processor (CPU) 405, cryptographic processor 410, RAM 415, ROM 420, video driver 425, video monitor 430, time date clock 435, communications port 440, input device 445, modem 450, and data storage device 460. All of these components may be identical to those described in FIG. 3.

There are many commercial software applications that can enable the communications required by seller interface 300 and buyer interface 400, the primary finctionality being message creation and transmission. Eudora Pro manufactured by Qualcomm, Inc., for example, provides editing tools for the creation of messages as well as the communications tools to route the message to the appropriate electronic address. When central controller 200 is configured as a web server, conventional communications software such as Netscape Navigator Web browser from America Online, Microsoft's Internet Explorer and other browsers may also be used. The buyer and seller may use the Netscape Navigator browser to transmit CPRC 100, seller response 110 or counteroffers 140. No proprietary software is required.

Online Embodiment

In one embodiment of the present invention, communications between buyer and seller take place via electronic networks, with central controller 200 acting as a Web server. The seller logs on to central controller 200, creates CPRC 100, and then disconnects from the network. CPRC 100 is made available to potential buyer by posting CPRC 100 on the Web page of central controller 200. Periodic maintenance is performed by central controller 200 to ensure that active CPRCs 100 have not expired, and that the buyer has sufficient resources available to accommodate seller who elects to bind CPRC 100. Buyer responses are transmitted electronically to central controller 200 which contacts the seller to indicate that CPRC 100 has been bound. Central controller 200 transfers credit acceptance to the seller as soon as CPRC 100 is bound.

Figure 5:
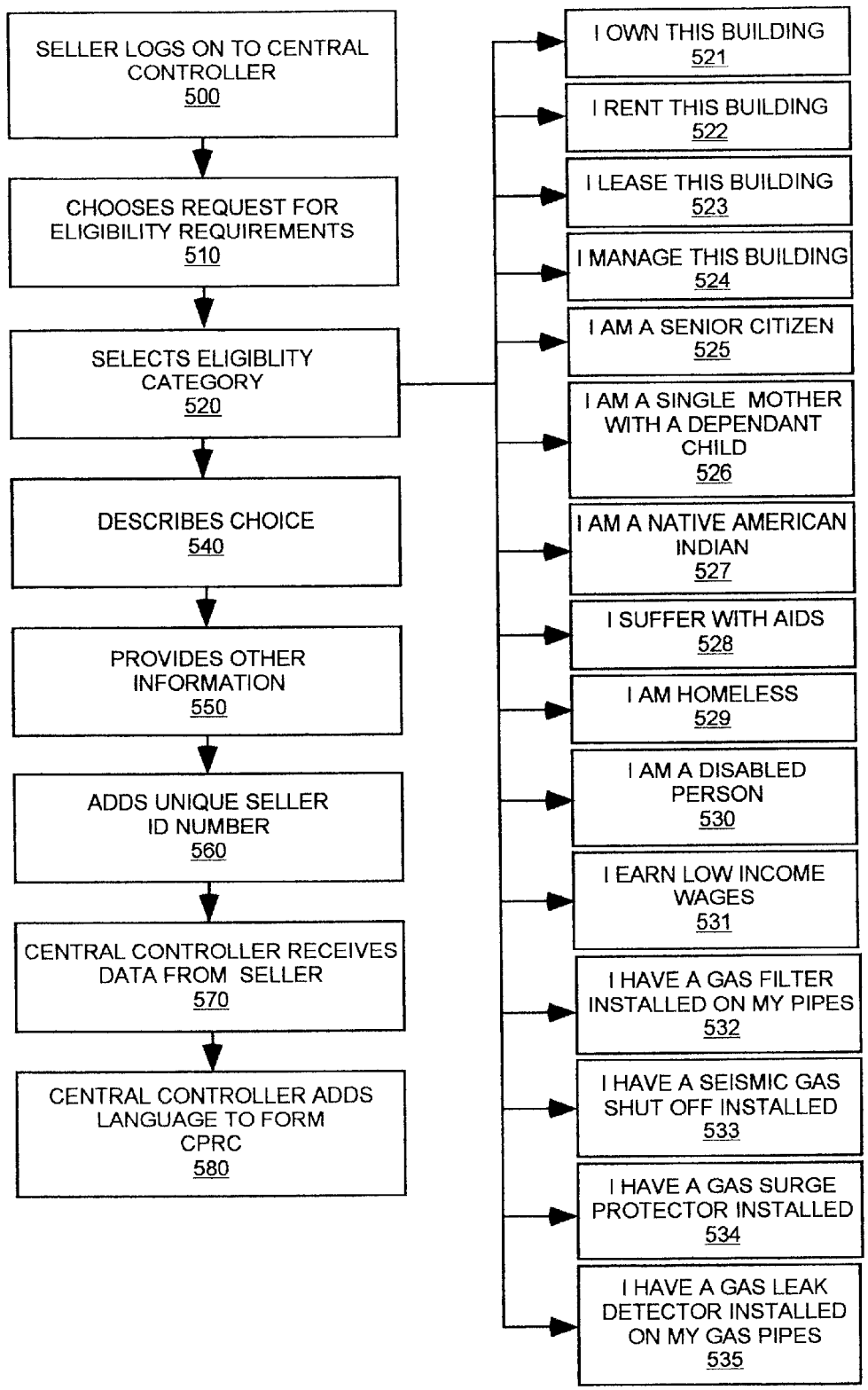
FIG. 5 illustrates an embodiment showing how a conditional pollution reduction credit offer is generated.

With reference to FIG. 5, there is described the process by which the seller formulates CPRC 100. At step 500, the seller logs on to central controller 200 using seller modem 350 of seller interface 300, establishing a communication link. It should be noted that seller may be an individual, a government, a partnership, corporation or any entity. In one embodiment, central controller 200 has a Web page on the Internet allowing the seller to provide information through the interface of conventional web browser software such as Netscape Navigator, manufactured by American Online, Inc. At step 510, the seller selects a request for eligibility requirements related to energy efficiency as outlined by Public Law 101-625, by selecting from a list of possible subjects. At step 520, the seller selects one or more categories to determine if seller is eligible under Public Law 101-625; for example, I own the building 521; I rent the building 522; I lease the building 523; I manage the building 524; I am a senior citizen 525; I am a single mother with a dependent child 526; I am a Native American Indian 527; I suffer with AIDS 528; I am homeless 529; I am a disabled person 530; I earn low income wages 531; I have a gas filter on my pipes 532; I have a seismic gas shut off valve on my pipes 533; I have gas surge protection 534; I have gas leak protection on my pipes 535. After the appropriate category is selected, a form is displayed on the video monitor 330 of seller interface 300. This form is an electronic contract with a number of blanks to be filled in by the seller, with each blank representing a condition of CPRC 100.

At step 540, the seller enters a description of the energy efficiency methods used to create the conditional pollution credit CPRC 100. A home owner for example, being a senior citizen and Native American Indian has a gas filter, leak detector and surge protector operating on his gas pipes. There being a place on the form for such eligibility categories, the seller simply fills in the blanks. The seller then adds other information at step 550. The seller, for example used an in-line gas pipe sampler, described elsewhere, to test his gas and paid a testing laboratory to analyze the contents of the gas. With test result showing Mercaptans were removed, resulting in the elimination of (ÒxÒ) number of pounds of SO2 from entering the outdoor environment and the seller wants to gift his ipCredits to the buyer subject to certain conditions. The seller then adds other conditions at step 555. The seller may want the buyer (local government agency) to force the gas utility to filter-clean the gas before delivery to the seller within 30 days of receipt of the gifted SO2 credit. These claims and conditions would be similarly entered into CPRC 100. Conditions are the terms of CPRC 100, allowing the seller to tailor CPRC 100 for seller's specific requirements. Conditions may also be based on other conditions. For example, one condition might state that two out of three other specified conditions must be met. Alternatively, each condition of CPRC 100 could be given a point value, with CPRC 100 requiring only that conditions be satisfied up to a certain total point value. For example, the seller may indicate that being a homeowner is worth 5 points, being a senior citizen is worth 2 points, and being a Native American Indian is worth 3 points, and Sulfuric Acid is worth 10 points a pound, while a gas filter is worth 3 points, a surge protector 1 point, and a leak detector 2 points. CPRC 100 could require that "twelve" points must be met in order to satisfy conditions of CPRC 100 to bind.

At step 550, the seller adds an expiration date to CPRC 100, if desired. This allows a seller to post CPRC 100 without worrying that he will be later bound after his needs have changed. At step 550 the seller enters a time limit. At step 560, the seller attaches his name or unique ID number to CPRC 100. This ID number is received from central controller 200 when the seller registers for the service, or is chosen by the seller and then registered with central controller 200 by phone. Central controller 200 maintains a database of seller ID numbers in a seller database 255, and issues (or allows) only unique numbers. If less security is required, the userÒs telephone number could serve as the ID number since it has the advantages of being both unique and easily remembered. If additional security is required, those procedures described in the cryptographic embodiment may be implemented.

Once the above elements have been developed, the seller transmits them to central controller 200 at step 570. The seller does this by clicking on a "send" button located on the screen in which he/she entered the terms of CPRC 100. At step 580, boilerplate legal language is added to the components of CPRC 100 to form a complete CPRC 100. The legal language is pulled from contract detail database 280 which stores a plurality of paragraphs. These paragraphs are linked together with the above contract elements to form a complete CPRC 100. The only elements missing which prevents CPRC 100 from being recognized as a legitimate contract is the name and signature of the seller.

Instead of a World Wide Web-based interface, sellers may also transmit CPRC 100 data via electronic mail, voice mail, facsimile, or postal mail transmissions. With voice mail, the seller calls a central controller 200 and leaves CPRC in audio form. These CPRCs 100 may be transcribed into digital text at central controller 200, or made available to potential buyer in the same audio format. In a postal mail embodiment, central controller 200 acts more like a router, directing CPRCs 100 to potential buyer, creating multiple copies of CPRC 100 if necessary. CPRC 100 may also be posted to bulletin boards or web pages operated by central controller 200. Central controller 200 supports a plurality of transmission methods, allowing for a wide variety of formats of CPRCs 100. Some formats may be changed, however, before further processing by central controller 200, CPRCs 100 transmit by mail in paper form, for example, may be scanned-in and digitized, using optical character recognition software to create digital text. These embodiments are more fully described in the off-line embodiment described later.

Figure 6:
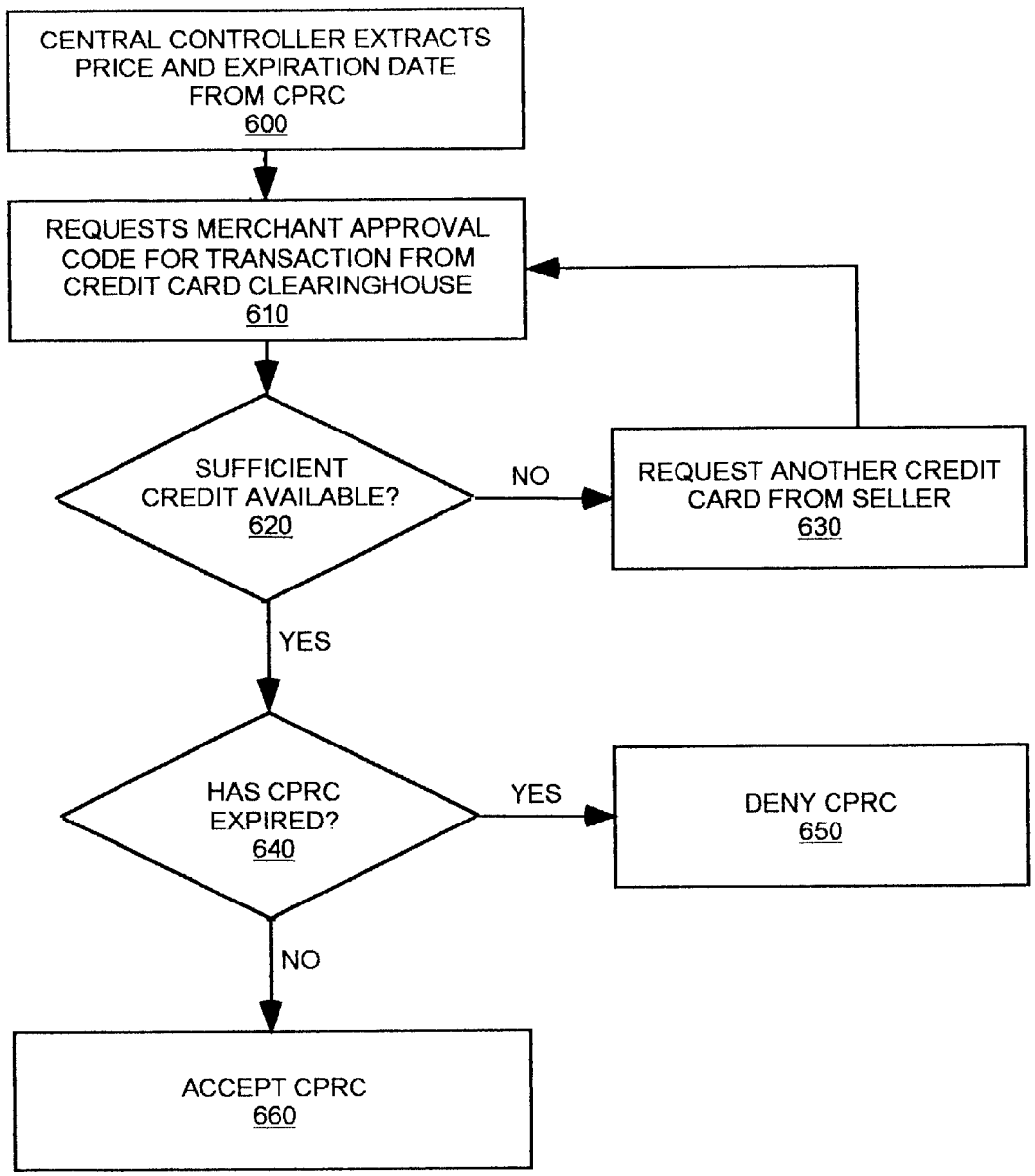
FIG. 6 illustrates an embodiment showing acceptance of a conditional pollution reduction credit offer by the central controller.

Referring now to FIG. 6, CPRC 100 is received and checked to see that sufficient credit is available to cover the stated cost of creating CPRC 100 by the seller, before CPRC 100 is made available to potential buyer. At step 600, central controller 200 extracts seller's name and credit card expiration date information from CPRC 100. At step 610, payment processor 230 submits a preauthorization of the payment of CPRC 100 to send to the credit card clearinghouse. This serves to "lock up" a portion of the available credit on a seller's credit card, preventing him from using up his credit while CPRC 100 is still active. At step 620, the credit clearinghouse responds to the pre-authorization, indicating whether sufficient credit is available. If sufficient funds are not available to cover the cost of the CPRC 100, another credit card number is requested from the seller at step 630. Once an additional credit card number has been transmitted, central controller 200 then resubmits the pre-authorization at step 610. At step 640, the expiration date of CPRC 100 is checked to s if it is already expired. If it has expired, CPRC 100 is rejected at step 650 and returned to the seller. If CPRC 100 has not yet expired, it is accepted at step 660.

Figure 7:
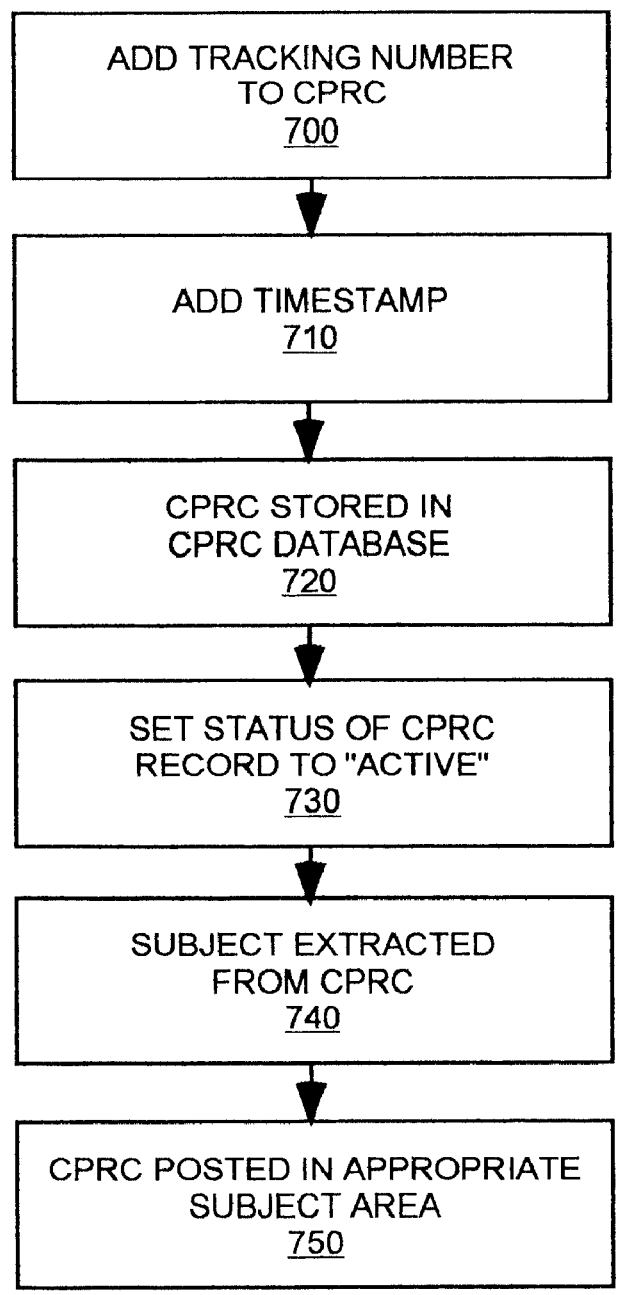
FIG. 7 illustrates an embodiment showing activation of a conditional pollution reduction credit offer.

Referring now to FIG. 7, there is illustrated an embodiment in which CPRC 100 is activated and made available to a potential buyer. At step 700, a unique tracking number is added to CPRC 100. Central controller time stamps CPRC 100 at step 710, and then stores CPRC 100 in CPRC database 265. CPRC database 265 contains a record of each CPRC 100, and includes fields such as status, subject, tracking number, time stamp, description of credits, settlement requirements, expiration date, conditions, and seller ID number. The status field has values of "pending", "active", "expired", and "completed". A status of "pending" means that the CPRC 100 is not currently available to potential buyer. Either it is still being processed by central controller 200, it has been temporarily suspended by the seller. An "active" CPRC 100 is available to potential buyer and can be bound. An "expired" CPRC 100 can no longer be bound. CPRCs 100 which have been bound by a buyer have a status of "completed".

After being stored at step 720, CPRC 100 may go through a series of processing steps. One step, if necessary, is language translation, either creating a standard language that all CPRCs 100 must be written in, or translating to the language most appropriate for buyer to which it will be sent. This language translation is provided by language experts at central controller 200, or by automatic translation software. The practice of language translation is provided by language experts is well known in the art and need not be described here in detail. For instance, with the advances being made each day in Internet commerce, language translation experts are readily available. For instance, twelve bi-directional language combinations are available, including English to/from French. Italian, German, Spanish, Portuguese and Japanese. Another step if necessary, is to edit for spelling errors. CPRC 100 might also be reviewed for clarity. Any CPRC 100 with an unclear term or condition would be returned to the seller for clarification. A seller listing an ipCredits for "nutural gas" instead of "natural gas" for example, might have CPRC 100 returned for clarification or correction.

Referring again to FIG. 7, the status of the database record for CPRC 100 is set to "active" at step 730. At step 740, the subject of CPRC 100 is extracted from the subject field. At step 750, CPRC 100 is posted in an appropriate subject area. This allows central controller 200 to display only to the most appropriate buyer. In an electronic environment, central controller 200 has a Web page for each possible subject area. Thus all CPRCs 100 offering ipCredits would be displayed on the "pollution credit offer" web page. This makes it much easier for potential buyer and other related parties to find appropriate CPRCs 100 they might want to bind as they can go straight to the subject whose credits they can settle. In an alternative embodiment, CPRC 100 is electronically mailed to a potential buyer and other related parties, either individually, or in groups. Potential buyer could elect to receive all CPRCs 100, or only those CPRCs 100 in their subject area, or a subset of CPRCs 100 representing certain conditions. For example, a small municipal government buyer might request that all NOx reduction CPRCs 100 for their geographic area be sent to them.

In an embodiment in which CPRCs 100 are being transmitted to the buyer, it is important to note that there are a number of hardware options for buyer interface 300. PDA's with wireless connections, and beepers or pagers with similar capabilities may be used. For example, a builder seeking a gas fired pizza oven that meets California's Proposition 65 requirements which requires business using natural gas in their operations post public warning placards could instruct central controller 200 to beep him whenever° CPRC 100 appeared with a gas filter ipCredit, or informing the local government buyer to log on to central controller 200 for further details.

Figure 8:
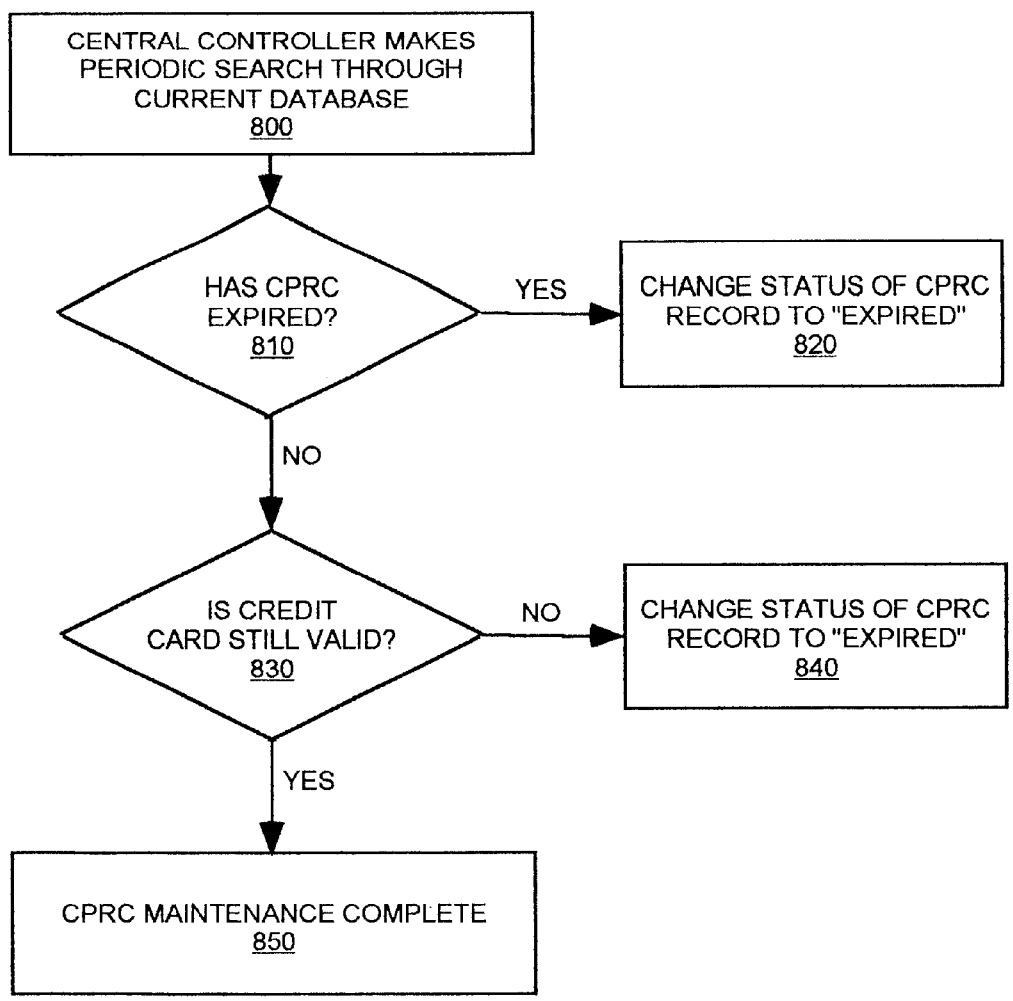
FIG. 8 illustrates one embodiment of the maintenance of an active conditional pollution reduction credit offer.

Referring to FIG. 8, there is illustrated a procedure for maintaining CPRCs 100. At step 800, central controller 200 searches CPRC database 265. At step 810, the expiration date field of each database record of CPRC 100 is compared to the current date. If the expiration date of CPRC 100 is earlier than the current date, the status of CPRC 100 is changed to "expired" at step 820. At step 830, payment processor 230 contacts credit card clearinghouse to verify that the seller credit card is still valid. If the card is not valid, the status of CRPC 100 is changed to ÒexpiredÓ at step 840. The maintenance process is completed at step 850 once all "active" CPRC 100 database records have been examined.

Figure 9:
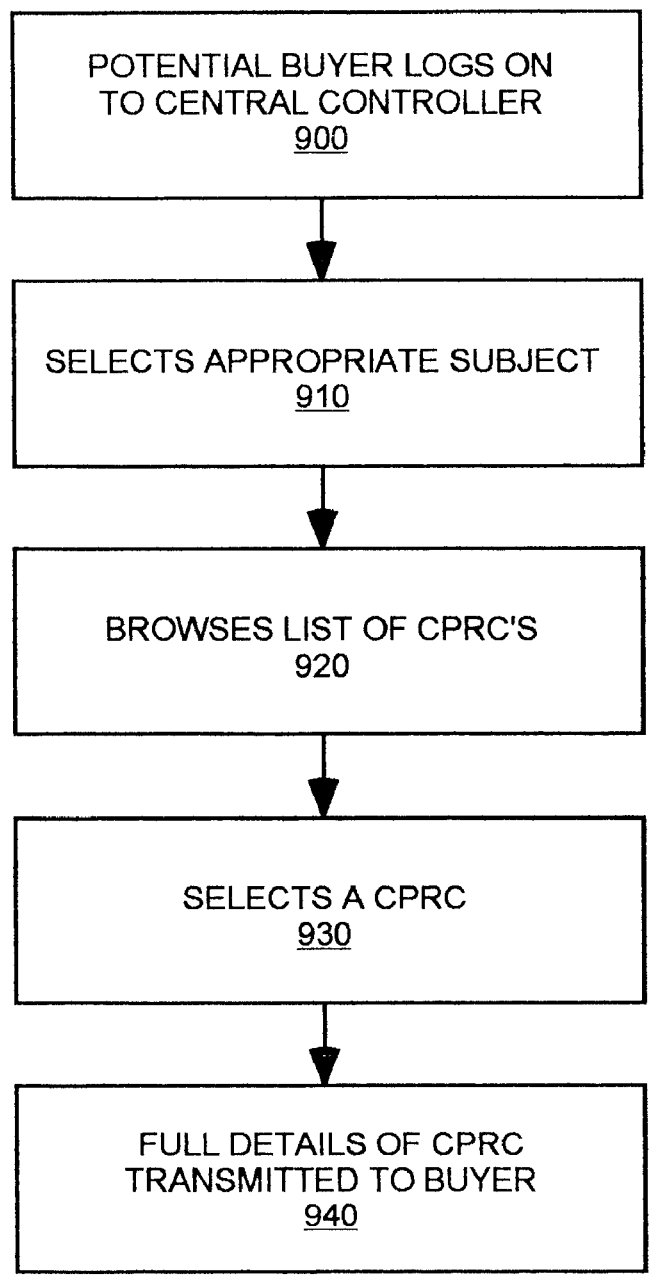
FIG. 9 illustrates an embodiment showing the buyer selecting a conditional pollution reduction credit offer.

FIG. 9 illustrates the process by which a potential buyer selects CPRC 100. At step 900, the potential buyer logs onto central controller 200 using modem 350 of buyer interface 300. At step 910, the potential buyer selects an appropriate subject area. For example, a buyer that has just experienced cancellation of it's Federal funds for repair of roads and bridges might search for offsetting pollution credits might search in the pollution credit subject area in the hopes of finding a CPRC 100 that meets it's funding reinstatement needs. At step 920, the potential buyer. browses the list of available CPRCs 100 (i.e. those with a status of "active"), CPRCs 100 may be listed with minimal details, with additional information available only if the potential buyer is interested in binding CPRC 100. A CPRC 100 might be listed as "air pollution credit-Jul. 10, 2000-San Francisco-credit trade-value 10" A potential buyer wanting more information about CPRC 100 may request additional information at step 940. In one embodiment, each CPRC 100 is hyperlinked to a separate Web page which provides complete details. The potential buyer clicks on CPRC 100 and is immediately transferred to the page of supporting details. These details might include the type of reduced chemical pollutant, the amount reduced, the energy efficiency method employed, and the requirements required to bind the ipCredits offer. In another embodiment, CPRC 100 is electronically transmitted to the buyer or related party, via electronic mail, fax, telephone, beeper, PDA, etc.

Figure 10:
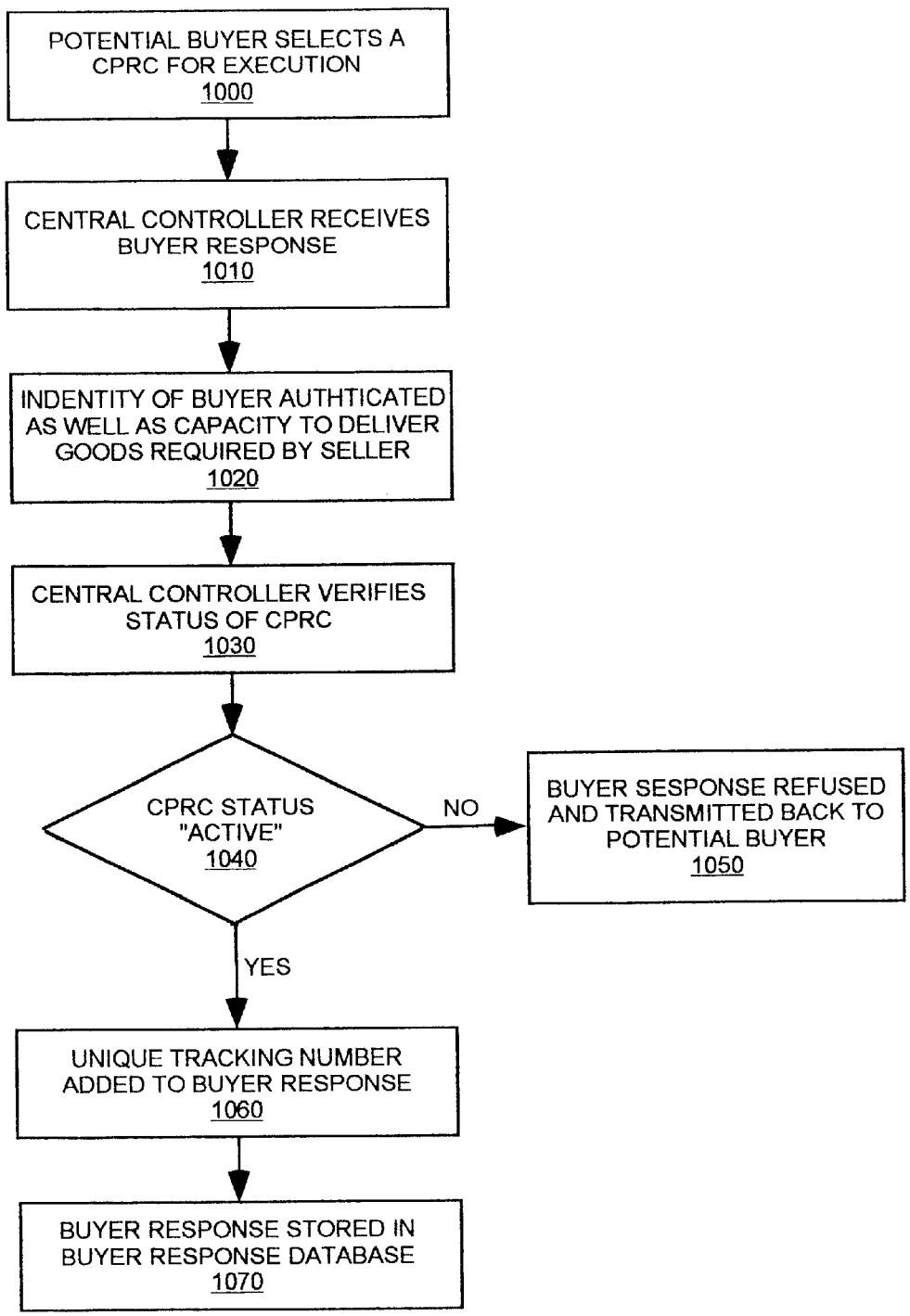
FIG. 10 illustrates an embodiment showing the binding of a conditional pollution reduction credit offer.
Figure 11:
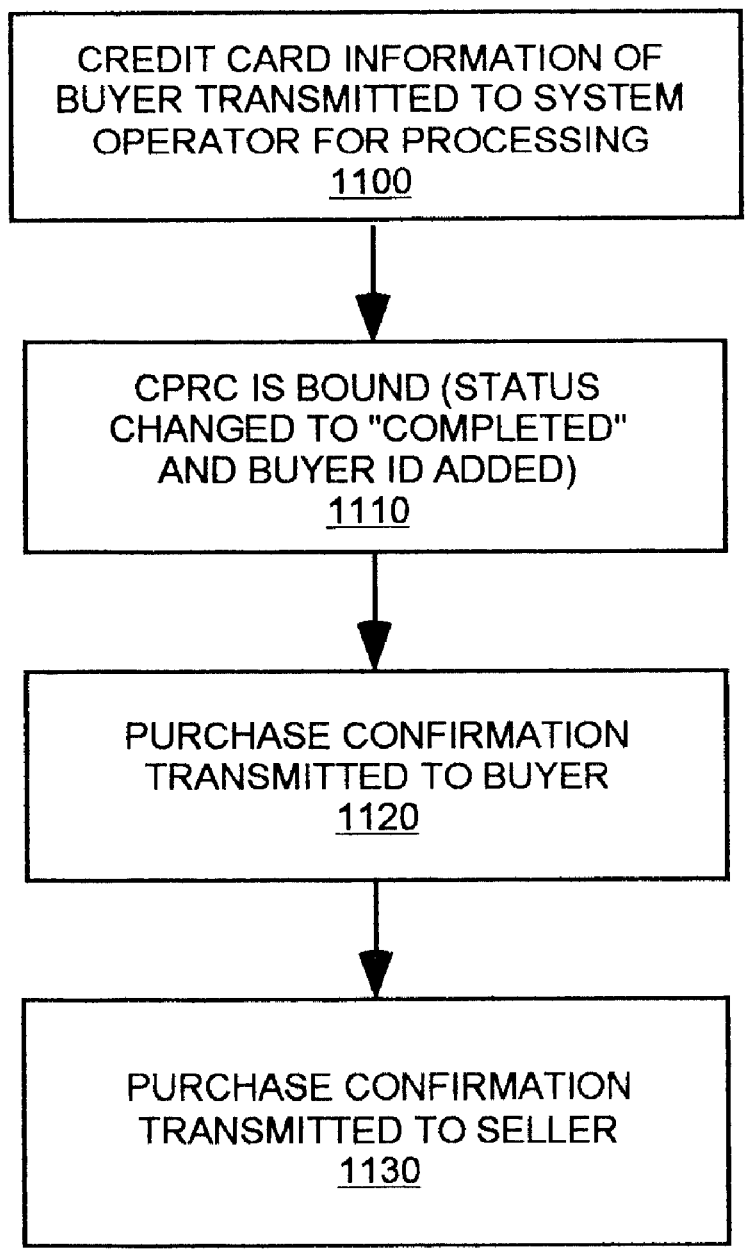
FIG. 11 illustrates an embodiment showing the seller qualifications for creating a conditional pollution reduction credit offer.

FIGS. 10 and 11 illustrate the process by which CPRC 100 is bound by a buyer. At step 1000, the potential buyer selects CPRC 100 which they would like to bind, developing buyer response. 150 which represents their intention to bind. At step 1010, central controller 200 receives buyer response 150 from the potential buyer. Central controller 200 then timestamps buyer response 150 and authenticates the identity of the buyer, as well as verifying their probable capacity to honor the terms of the seller's requirements. The time stamp allows central controller 200 to determine the first unconditional acceptance to be received. If two buyer responses 150 are received within a few seconds of each other, the time stamp allows central controller 200 to decide which was received first. Alternatively, the time stamp may be appended to buyer response 150 at the time it is transmitted from buyer interface 300, using clock 335 of buyer interface 300.

Authentication of buyer's identity involves central controller 200 extracting the buyer ID from buyer response 150 and looking up the buyer's identity in buyer database 260. Information in buyer database 260 then provides an indication of the buyer's ability to meet seller requirements. Before a buyer can bind CPRC 100 for example, central controller 200 must authenticate that the buyer is a municipal government in the seller's jurisdiction. If necessary, central controller 200 may verify that the buyer can provide the specific requirement requested by the seller. Rather than just verifying that the buyer is a municipal government, central controller 200 may verify that it franchises a gas utility that serves the seller. In another embodiment, the buyer incorporates buyer response 150 into CRPC 100, signing CPRC 100 by adding an indication that the contract is agreed to. This indication could be a digital signature, or could involve adding a symbol or indicia representative of the buyer.

Central controller 200 then verifies the status of CPRC 100 at step 1030 determrining whether or not the status of CPRC 100 is "active" at step 140. If CPRC 100 is currently "active", a unique tracking number is added to buyer response 150 at step 1060. Central controller 200 then stores buyer response 150 in buyer response database 270 at step 1070. If the status of CPRC 100 is not "active" at step 1040, buyer response 150 is refused by central controller 200 and transmitted back to the potential buyer at step 1050.

In another embodiment, the buyer transmits buyer response 150 directly to the seller at step 1010. The seller may then send buyer response 150 to central controller 200 for verification and authentication, or he may choose to accept buyer response 150 without verification and authentication.

In FIG. 11, the buyer might pay for an ipCredit purchase at step 1100, when a credit card number and approval code for the selected CPRC 100 is transmitted to the electronic based system operator account 296. At step 1110 CPRC 100 is bound, turning CPRC 100 into a legally binding contract between the buyer and the seller. The binding process requires that the status of CPRC 100 be changed to "completed" preventing subsequent buyers from being able to bind CPRC 100. The binding process also requires that the buyer ID be added to CPRC 100. At step 1120, central controller 200 sends settlement confirmation 120 to the buyer and then sends it to the seller at step 1130.

In another embodiment, multiple buyers may bind CPRC 100. In this case, CPRC 100 may maintain it's status of "active" until a given number of sellers have responded, and only then is the status of CPRC 100 changed to "completed". For example, a small municipality may initiate a CPRC 100 by offering a special tax credit for fifty pounds of "Particulate Matter" at CPRC 100. A condition of the buyer's CPRC 100 may state that the offer is open to the first ten sellers to respond, allowing for the ten to bindable contracts, which allows the buyer to accumulate the needed amount of pollution credited from various sellers. Another option is to open CPRC 100 to any number of bindings, or any number of bindings up to the limit provided by the buyer.

There are many methods by which the providers of the system could derive a revenue stream. In one embodiment, a flat fee is charged for every CPRC 100 submitted. There could also be a flat fee that would cover any number of CPRCs 100 over a given period of time, allowing sellers to subscribe to the service much as they would subscribe to a magazine. In another embodiment, central controller 200 calculates a discounted value of the price in which sellers receive only a percentage of the fee paid for a CPRC 100. In another embodiment, advertisers pay to have messages listed along with CPRCs 100, supplementing the costs of operating the system. In another embodiment, a percentage of the value of the CPRC is charged.

Figure 12:
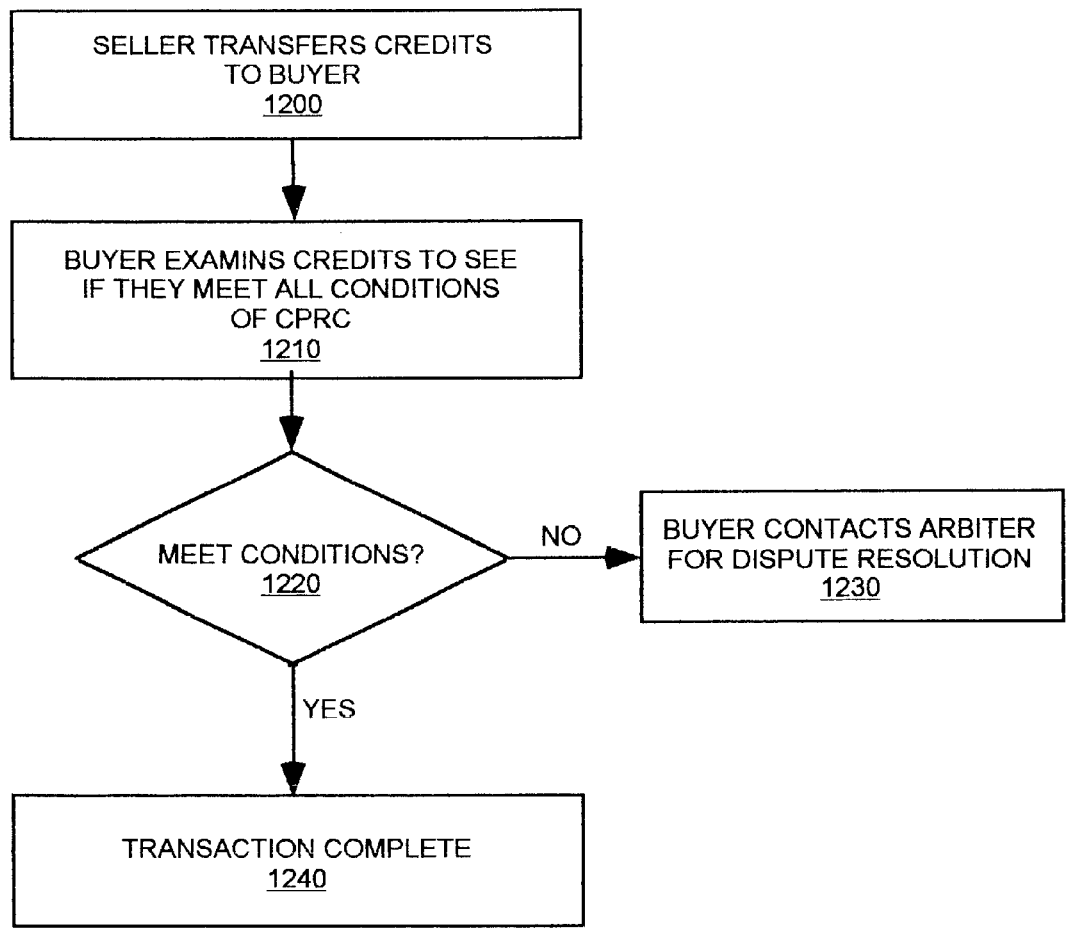
FIG. 12 illustrates an exemplary procedure for exchanging pollution for settlement demands between the seller and buyer.

FIG. 12 illustrates the exchange of pollution credit between seller and buyer. At step 1200, the seller transfers the specified ipCredit to the buyer. This transfer could involve the delivery of the physical ipCredits as well as digital credits. Physical credits might include a certificate, a coupon, a document or the like. Digital credit might include documents, coupons, certificates, credits, reimbursements, discounted payment plans, access codes, compliance with stated time requirements to produce results, etc. For example, a city government might transfer a confirmation that it has notified the utility covered by the pollution credit requirement of the seller to comply with pollution compliance codes within ten days or suffer loss of the utility's franchise. At step 1210, the buyer examines the delivered pollution credits to see if they meet all conditions and terms of the CPRC 100. A buyer negotiating a Smog ipCredits, for example, would verify that the Nitrous Oxide (NOx) levels contained in the ipCredits was the correct chemical needed to offset Smog reduction for the buyer (government agency). At step 1220, if the credit does not meet the buyer's conditions as described in CPRC 100 the buyer contacts an arbiter at central controller 200 for dispute resolution. This process is described in more detail in the dispute resolution embodiment described later. At step 1240 the transaction is complete.

Payment Preferences

Figure 13:
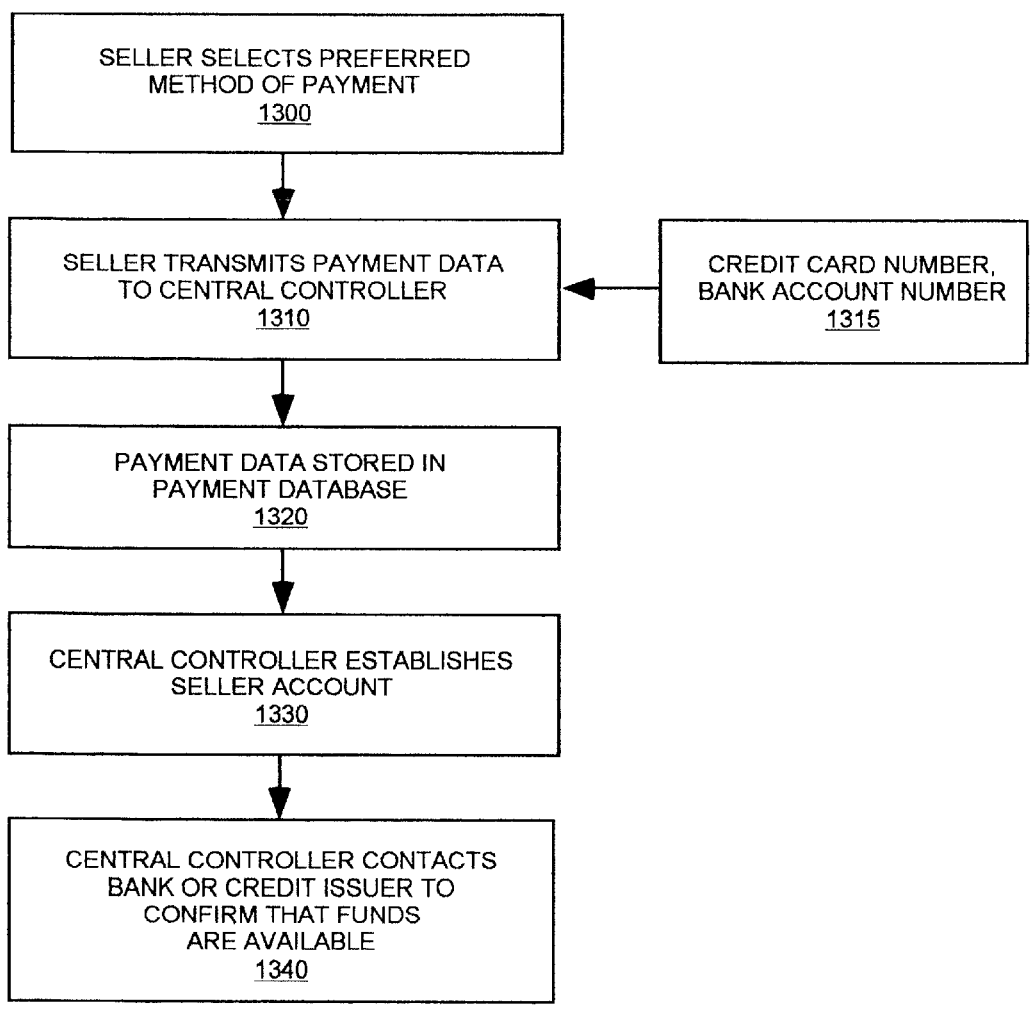
FIG. 13 illustrates an exemplary payment method.

FIG. 13 illustrates a protocol in which central controller 200 establishes seller account 298. At step 1300, the seller selects his preferred method of payment for clearing a CPRC 100. Preferred methods might include credit cards, personal checks, electronic funds transfer, digital money, etc. At step 1310, the seller transmits payment data corresponding to his preferred method of payment to central controller 200. As indicated by box 1315, such payment data might include credit card number or bank account number. These payment methods are meant to be merely illustrative, however, as there are many equivalent payment methods commonly known in the art, which may be preferred by the seller such as barter, gift, deposit, deed, transfer, set-aside, etc. If the seller wants to pay by credit card, for example, payment data would include his credit card account number, expiration date, name of issuing institution, credit limit, and name as it appears on the card. For electronic funds transfer, payment data includes the name of the seller's bank and his account number. At step 1320, central controller 200 stores payment data and payment preferences in payment database 285.

At step 1330, central controller 200 establishes seller account 298 which either stores money transferred by the seller or serves as a pointer to an account of the seller outside the system. For sellers using credit cards, for example, seller account 298 contains the credit card number, expiration date, and narne of the issuing institution. Sellers could also transfer money to central controller 200 to be stored in seller account 298, which would operate like a conventional checking account. Central controller 200 would send a check to the system operator performing the pollution credit work for the seller, written on seller account 298. Alternatively, central controller 200 could electronically move the funds directly from the seller account 298 to the system operator account 296. At step 1340, central controller 200 contacts the bank or credit card issuer to confirm that funds are available. A seller is thus unable to use a credit card with no credit available to establish seller account 298.

The above protocols may be similarly applied to buyers, allowing for the creation of buyer account 297. The primary difference being the system operator account 296 is primarily used for deposits, with money flowing from buyer to system operator in the case of deposit returns or refunds when the buyer does not find the work performed in creating a credit is acceptable. Verification of funds available is therefore not important for buyers.

Although the online embodiment describes a protocol in which central controller 200 transmits credit card information to the system operator account 296 for processing, there are of course many payment protocols under which payment may be transferred from seller to system operator account 296. In one embodiment, processing the credit card is performed by central controller 200, not the system operator. Central controller 200 looks up the credit card number of the seller in payment database 285. This credit card number is transmitted to payment processor 230. Payment processor 230 contacts the credit card clearinghouse to get an authentication number. The billable amount appears on the credit card statement of the seller in his monthly statement. The clearinghouse posts this amount to the system operator account 296. Central controller 200 updates payment database 285 to indicate that payment has been made. Central controller 200 could also arrange for payment to be made directly to system operator account 296. The system operator, for example, might receive the checking account number of the seller. Account information could also be embedded into CPRC 100 and seller response 110, allowing seller and system operator to complete payment once they each had a copy of information required to create the CPRC 100.

Another embodiment of payment involves procedures using digital cash. Central controller 200 looks up the seller's delivery address in payment database 285. This address is transmitted to payment processor 230, with the digital cash being downloaded from the seller. Central controller 200 updates payment database 285 to indicate that payment has been made. This address may be an electronic mail address if digital cash is to be transferred by electronic mail, or could be an Internet Protocol address capable of sending an on-line transfer of digital cash. This electronic delivery address is sent to payment processor 230. The digital cash is downloaded to system operator account 296. Central controller 200 then updates payment database 285 to indicate that payment has been made. Using these digital cash protocols, it is possible for the seller to include payment along with creating the pollution credit CPRC 100 in electronic form.

The practice of using digital cash protocols to effect payment is well known in the art and need not be described here in detail. For instance, with the advances being made each day in Internet commerce, digital cash is common place today.

Delayed Payment Embodiment

Although the on-line embodiment describes a protocol in which pollution credit sellers receive settlement immediately upon binding CPRC 100, other embodiments may be implemented in which payment is delayed until ipCredits have been received by the buyer, or delayed until some predetermined date, partial settlement and installation settlements are supported by the system.

Escrow account 299 allows settlement to be delayed until the seller completes delivery of the ipCredits, while at the same time ensuring that the buyer will in fact make good on the seller's settlement requirements. Central controller 200 establishes escrow account 299 as a temporary holding account. When the buyer binds CPRC 100 at step 1110, settlement is transferred from seller account 298 to escrow account 299. Only after the credits have been received by the buyer is settlement conditions transferred from escrow account 299 to seller account 298. The buyer may transmit a digitally signed release message to central controller 200, authorizing the release of the escrowed settlement to the seller.

In another embodiment, the buyer makes a partial settlement when CPRC 100 is bound, and then completes settlement when the credits are received. The fraction of the offered settlement of CPRC 100 to be paid upon binding is a condition of CPRC 100 and is stored in payment database 285 when CPRC 100 is bound. Central controller 200 releases this portion of the settlement at step 1110, and then releases the remaining portion after credits have been delivered at step 1200. The partial settlement made upon binding may be non-refundable. This would allow an individual seller, for example, to sell his credit that was canceled on two days notice, for example, with cancellation within the two day period resulting in the forfeiture of deposit.

In yet another embodiment, CPRC 100 describes the use of installment settlements. The first installment settlement is made when CPRC 100 is bound, followed by regular installment settlements as specified in the conditions of CPRC 100. The dates at which settlement installments are to be made are stored in payment database 285. This would allow the buyer, for example, to enter into negotiations with a franchised utility within the required time limit conditioned by the seller, while working out the details of the seller's demands relating to the local government buyer and franchised utility.

Cryptographic Authentication Embodiment

In the previous embodiments, authentication of the seller and buyer involves checking the attached ID or name and comparing it with those stored in seller database 255 and buyer database 260. Although this procedure works well in a low security environment, it can be significantly improved through the use of cryptographic protocols. These protocols not only enhance the ability to authenticate the sender of a message, but also serve to verify the integrity of the message itself, proving that it has not been altered during transmission. A utility manager for a local government agency, for example, could be prevented from binding CPRCs 100 requiring performance by a superior official, as their identity would not be authenticated. Encryption can also prevent eavesdroppers from learning the contents of the message. A competing utility franchise, for example, could be prevented from reading any intercepted seller response 110 generated by another competitor. Such techniques shall be referred to generally as cryptographic assurance methods, and will include the use of both symmetric and asymmetric keys as well as digitized signatures and hash algorithms.

The practice of using cryptographic protocols to ensure the authenticity of senders as well as the integrity of messages is well known in the art and need not be described here in detail. For reference, one of ordinary skill in the art may refer to "Applied Cryptography, Protocols, Algorithms, and Source Code in C", second edition, John Wiley & Sons., Inc. 1996.

Figure 14:
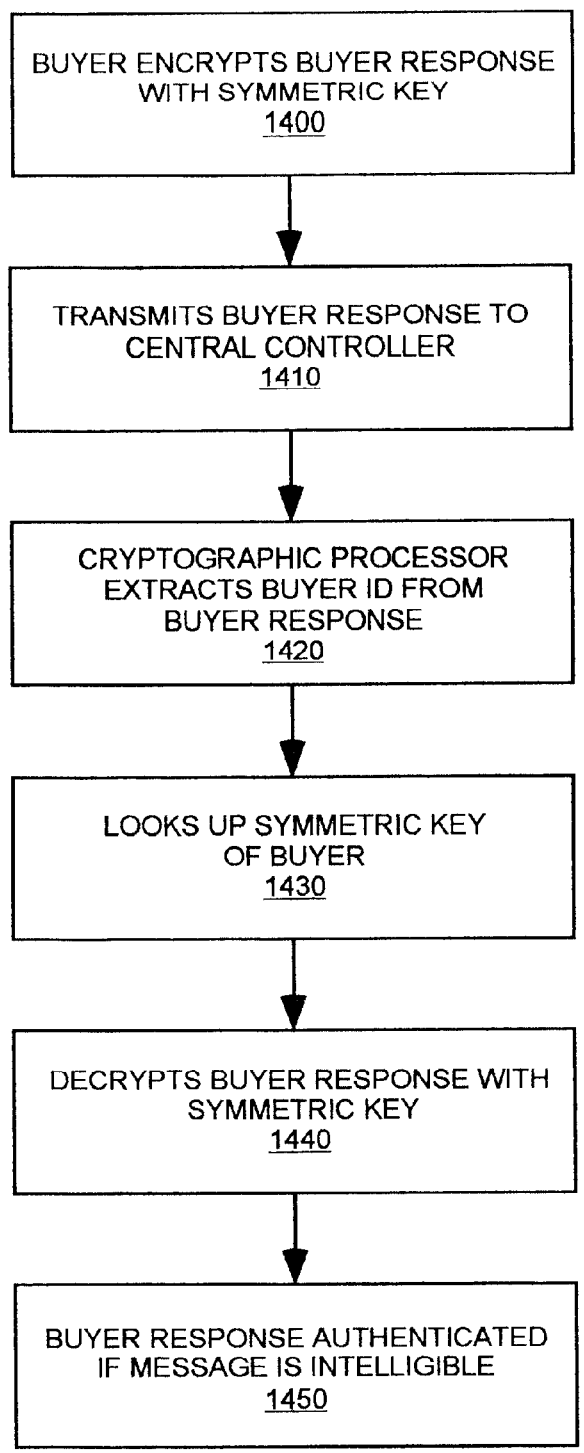
FIGS. 14 through 17 illustrate exemplary authentication procedures using cryptographic protocols.

FIG. 14 describes a symmetric key embodiment in which the buyer and central controller 200 share a key. Thus both encryption and decryption of buyer response 150 are performed with the same key. This encryption may be implemented with an algorithm such as DES (U.S. Government standard, specified in FIPS PUB 46), or with any of several algorithms known in the art such as IDEA, Blowfish, RC4, RC2, SAFER, etc. The buyer encrypts buyer response 150 with his assigned symmetric key at step 1400, using cryptographic processor 410 of buyer interface 400. The key may be stored in message database 470 or otherwise stored or memorized by the buyer. The encrypted buyer response 150 is then transmitted to cryptographic processor 210 of central controller 200 at step 1410. Cryptographic processor 210 extracts the buyer ID from response 150 at step 1420 and looks up the symmetric key of the buyer in cryptographic key database 290 at step 1430, decrypting buyer response 150 with this key at step 1430. Cryptographic key database 290 contains algorithms and keys for encrypting, decrypting, and/or authenticating messages. At step 1450, if the resulting message is intelligible, then it must have been encrypted by the same key, authenticating that the buyer must have indeed been the author of buyer response 150.

This procedure makes it significantly more difficult for an unauthorized buyer to represent himself as a legitimate buyer. Without cryptographic procedures, an unauthorized buyer who obtained a sample buyer response 150 from a legitimate buyer would be able to extract the buyer ID number and then attach this ID number to unauthorized buyer responses 150. When buyer response 150 has been encrypted with a symmetric key, however, an unauthorized buyer obtaining a sample buyer response 150 only discovers the buyerOs ID number, not the symmetric key. Without this key, the unauthorized buyer cannot create a buyer response 150 that will not be discovered by central controller 200, since he cannot encrypt his message in the same way that the authorized buyer could. The symmetric key protocol also ensure that buyer response 150 has not been tampered with during transmission, since alteration of the message requires knowledge of the symmetric key. An encrypted buyer response 150 also provides the buyer with the more anonymity.

Figure 15:
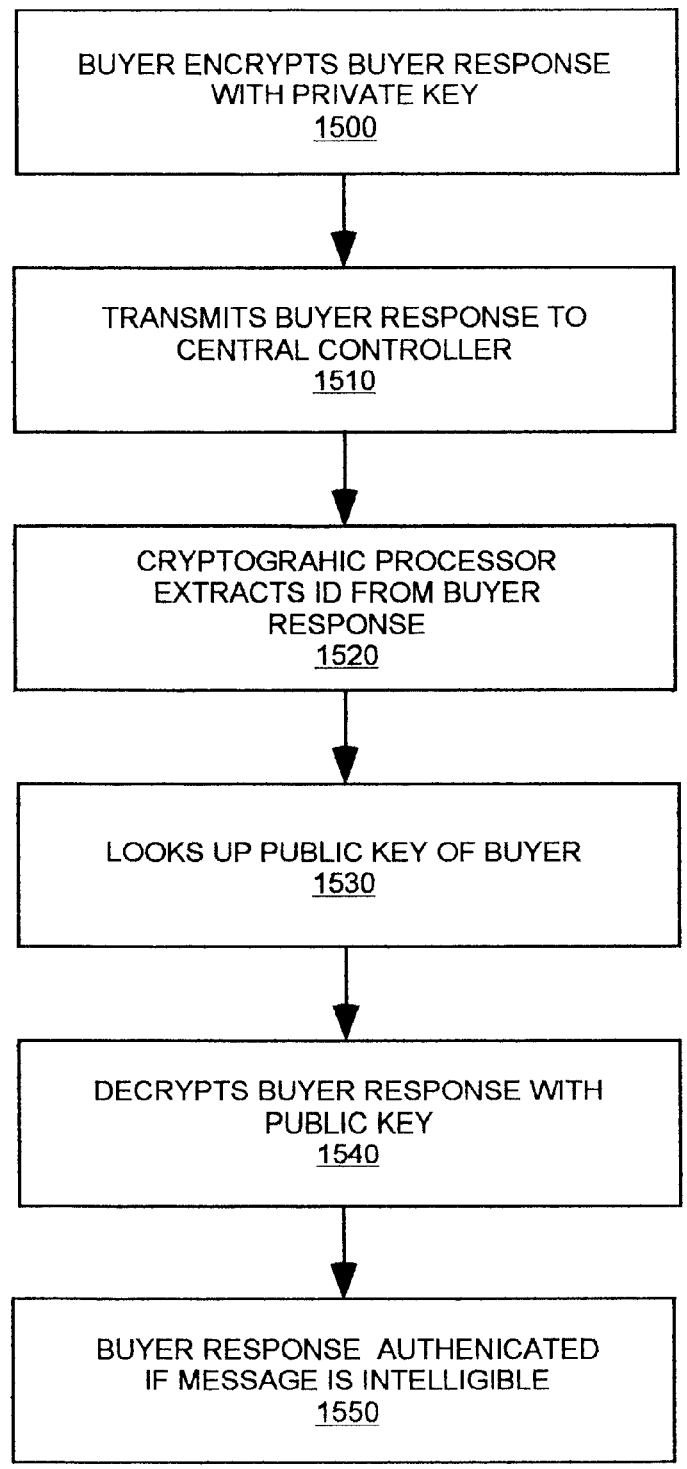

FIG. 15 illustrates a symmetric key protocol in which buyer response 150 is encrypted with a private key and decrypted with a public key. Two such algorithms for this procedure are RSA and DSA. At step 1500, the buyer encrypts buyer response 150 with his private key using cryptographic processor 310, transmitting buyer response 150 to central controller 200 at step 1510. Cryptographic processor 210 extracts the buyer ID at step 1520 and looks up the buyerÕs associated public key in cryptographic key database 290 at step 1530, decrypting buyer response 150 with this public key at step 1540. As before, if buyer is intelligible then central controller 200 has authenticate the buyer at step 1550. Again, unauthorized buyers obtaining buyer response 150 before it was received by central controller 200 are not able to undetectably alter it since they do not know the private key of the buyer. Unauthorized buyers would, however, be able to read the message if they managed to obtain the public key of the buyer. Message secrecy is obtained if the buyer encrypts buyer response 150 with his public key, requiring the attacker to know the buyer's private key to view buyer response 150.

Figure 16:
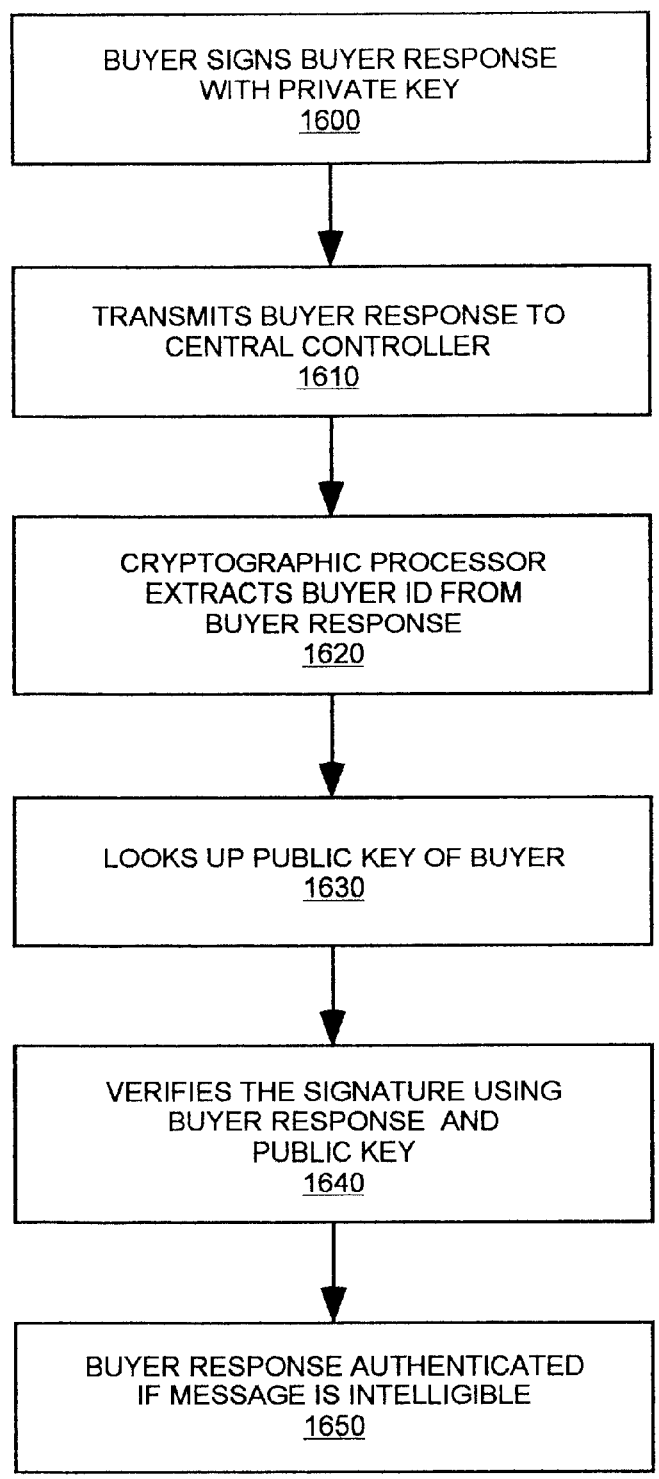

FIG. 16 shows a cryptographic technique using digital signatures to provide authentication and message integrity. One such algorithm is DSA (Digital Signature Algorithm), the U.S. Government standard specified in FIPS PUB 186. As in the asymmetric protocol described above, each buyer has an associated public and private key. The buyer signs buyer response 150 with his private key at step 1600 with cryptographic processor 310 and transmits it to central controller 200 at step 1610. Central controller cryptographic processor 210 extracts the buyer's ID at step 1620 and looks up the buyer's public key at step 1630, verifying the signature using buyer response 150 and the public key of the buyer at step 1640. If buyer response 150 is intelligible, then central controller 200 accepts buyer response 150 as authentic at step 1650.

Figure 17:
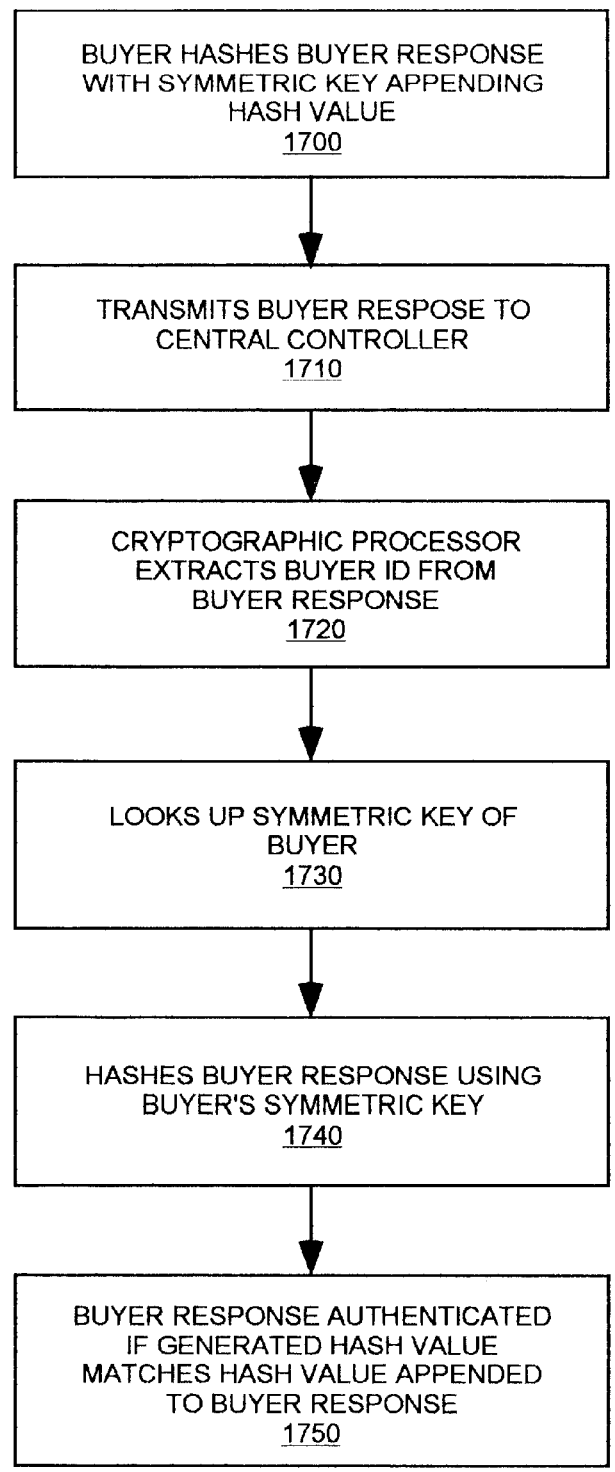

FIG. 17 is an illustration that describes a cryptographic technique using message authentication codes for verifying the authenticity and integrity of buyer response 150. In the hash protocol of the present invention, the buyer and central controller 200 share a symmetric key, which the buyer includes in a hash of buyer response 150 at step 1700. In the hash protocol, a one-way function is applied to the digital representation of buyer response 150, generating a code that acts much like the fingerprint of buyer response 150. Any of the MAC algorithms, such as RIPE-MAC, IBC-Hash, CBC-MAC, and the like may be applied in this application. After transmitting buyer response 150 to central controller 200 at step 1710, cryptographic processor 210 extracts buyer ID from buyer response 150 at step 1720. Then cryptographic processor 210 looks up the buyer's symmetric key at step 1730 and hashes buyer response 150 with this symmetric key at step 1740, comparing the resulting hash value with the hash value attached to buyer response 150. If the values match at step 1750, the integrity of buyer response 150 is verified along with the authenticity of the buyer.

Although cryptographic techniques can provide greater confidence in the authenticity of buyer response 150, they are useless if the buyer's cryptographic keys are compromised. An attacker obtaining the symmetric key of another buyer is indistinguishable from that buyer in the eyes of central controller 200. There is no way to know whether the buyer was the true author of buyer response 150, or an attacker with the right cryptographic keys. One way to solve this problem, known as undetected substitution, is to use biometric devices such as a fingerprint reader, voice recognition system, retinal scanner and the like. These devices incorporate a physical attribute of the buyer into buyer response 150, which is then compared with the value stored in buyer database 260, at central controller 200. In the present invention, such devices attach to buyer interface 400.

Fingerprint verification, for example, may be executed before the creation of buyer response 150, during the generation of buyer response 150 in response to prompts from central controller 200, at some predetermined or random times, or continuously by incorporating the scanning lens into buyer interface 400 such that the buyer is required to maintain his finger on the scanning lens at all times for continuous verification while buyer response 150 is generated.

Fingerprint verifiers are readily available and are adaptable to any PC via Interface card. The practice of using digital fingerprint verifiers is well known in the art and need not be described here in detail. For instance, Oracle7, version 7 7.3., includes a fingerprint verifier protocol. Fingerprint verifiers typically utilize an optical scanning lens. The buyer places his finger on the lens, and the resulting image is scanned, digitized, and the data compressed and stored in memory. Typically, a 256 byte file is all that is required. Each live-scan fingerprint is compared against the previously enrolled and stored template, and stored in data storage device 360. If the print does not match, the cryptographic processor 335 may prevent the buyer from generating a buyer response 150.

Another embodiment is voice recognition, where the buyer's voice is used to verify his identity. This embodiment has the advantage of not requiring the use of any specialized hardware since it can be implemented over a standard telephone connection. The buyer's identity is verified at central controller 200. The process of obtaining a voice-print and subsequently using it to verify a person's identity is well-known in the art, and therefore need not be described in detail herein. One of ordinary skill in the art may use voice identification/verification technology. The practice of using voice identification/verification technology is well known in the art and need not be described here in detail. For instance, conventional speaker identification software samples the buyer's voice. This sample is stored at central controller 200 in buyer database 260. Each time the seller wants to transmit seller response 110 to central controller 200, he/she is required to call central controller 200 and speak into the phone at the prompt for a voice sample. If this sample matches that stored in buyer database 260, the seller is provided a password which is incorporated into the digital signature appended to seller response 110. Any seller response without an appropriate voice match is not accepted. The voice-print may also be stored in a database within data storage device 360 of seller interface 300, to verify the seller's identity locally prior to allowing seller response 110 to be created.

Although the above cryptographic and biometric protocols describe the authentication and validation of seller response 110, they may be equally applied to the authentication and validation of CPRC 100, counteroffer 140, buyer response 150, settlement confirmation 120, or any other message or communication between sellers and central controller 200.

Counter-offer Embodiment

In one embodiment of the present invention, buyers respond to CPRC 100 not by binding it, but by making a counteroffer with modified and/or additional conditions. A local government owned utility, for example, might view CPRC 100 for meeting it's unique air quality needs, and thus want to develop and issue a counteroffer rather than electing to bind CPRC 100. The counteroffer is similar to CPRC 100 except that the buyer is binding the seller instead of allowing it's parent agency to bind the CPRC 100. The counteroffer is also directed to a specific party within the local government agency, unlike a CPRC 100 which may be directed to a plurality of buyers.

Figure 18:
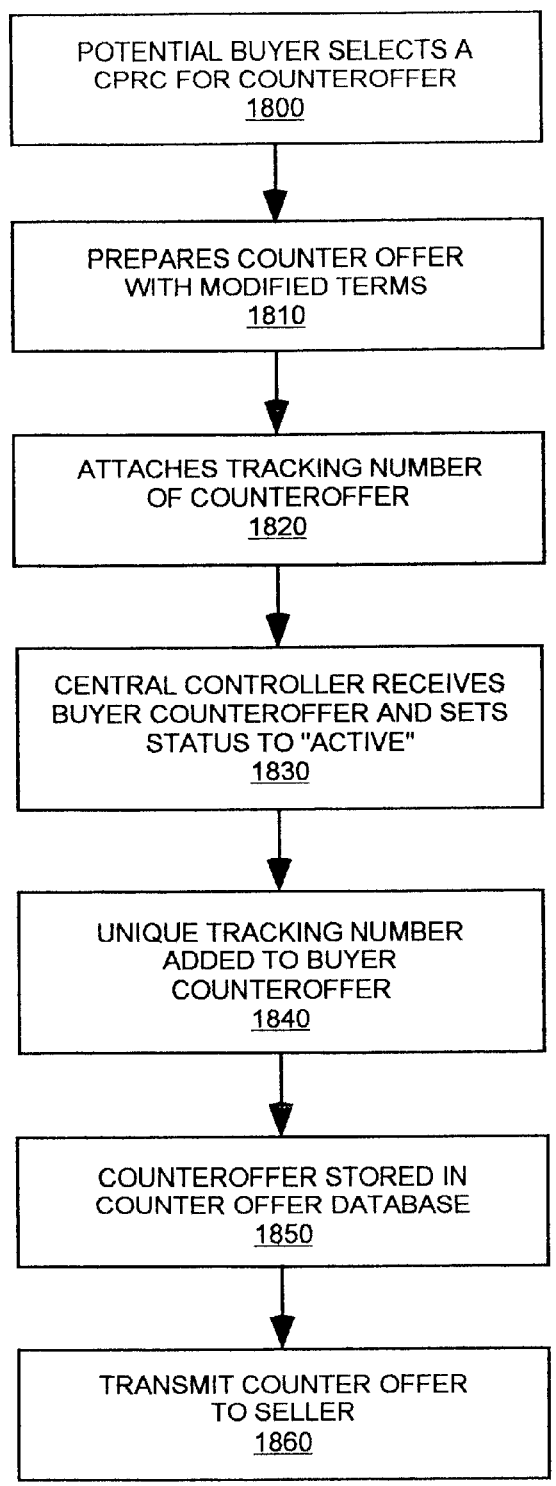
FIGS. 18 and 19 illustrate an exemplary embodiment for counteroffers by a buyer.

FIG. 18 illustrates the development of counteroffer 140. At step 1800, the potential buyer selects CPRC 100 for which he wants to make a counteroffer. At step 1810, the buyer prepares a counteroffer 140 with modified conditions. The buyer follows the same process that the seller uses to generate CPRC 100 (steps 500 through 580), selecting the conditions of counteroffer 140. Alternatively, the buyer is presented with an electronic copy of CPRC 100 and is allowed to edit those conditions that the buyer wants to change. For example, a buyer owned utility might want to extend credit to the seller for installing a gas filter on his gas pipes. At step 1820, the buyer attaches the tracking number of CPRC 100 to counteroffer 140. Central controller 200 receives counteroffer 140 at step 1830, setting status to "active". Central controller 200 then adds a unique tracking number to counteroffer 140 at step 1840, and stores it in counteroffer database 267 at step 1850. Central controller 200 extracts the tracking number of CPRC 100 attached to counteroffer 140 in order to find the seller to whom counteroffer 140 is transmitted at step 1860.

Figure 19:
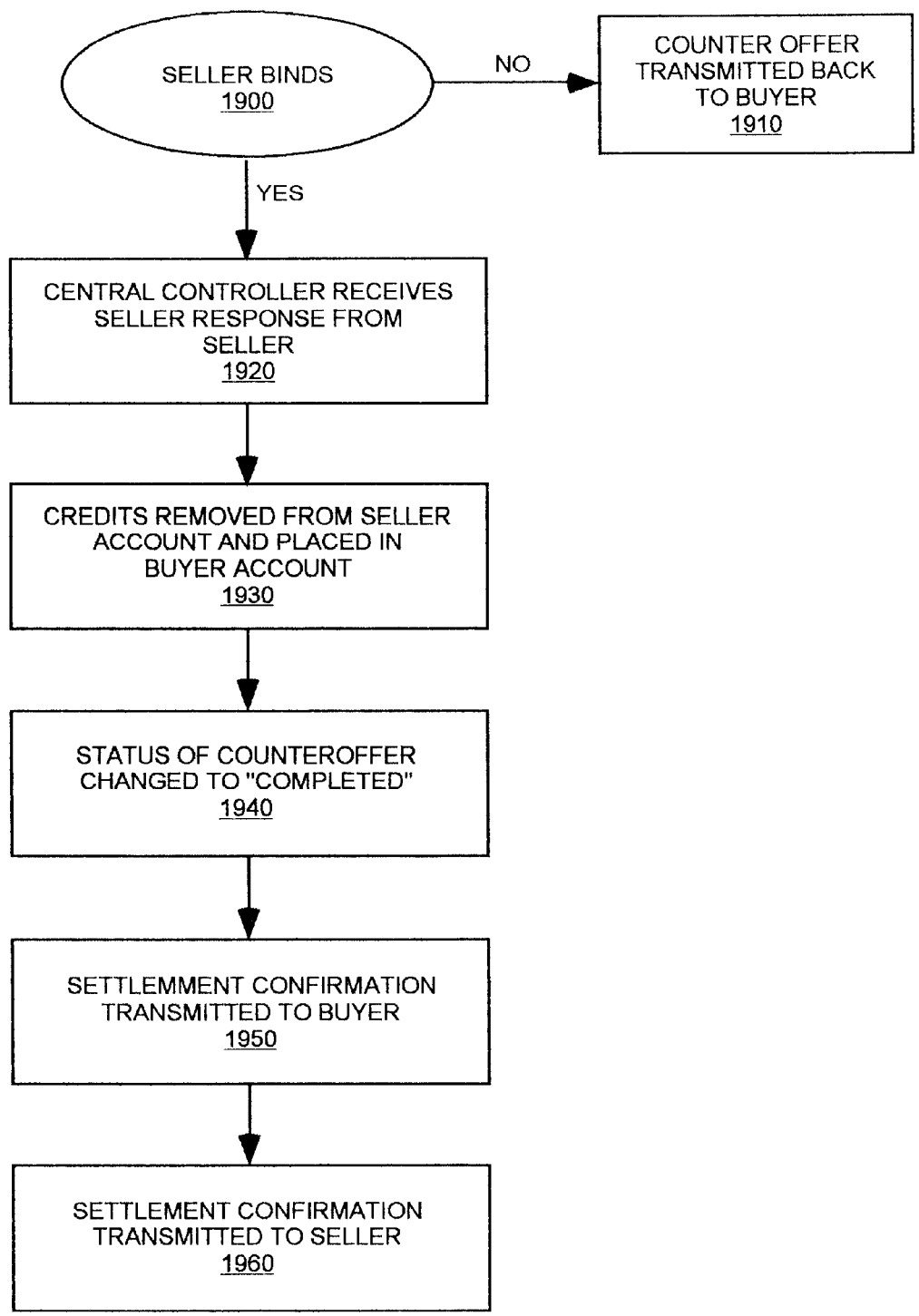

FIG. 19 illustrates the process by which the seller responds to counteroffer 140. At step 1900, the seller decides whether or not to bind the counteroffer 140. If he does not bind, counteroffer 140 is transmitted back to the potential buyer at step 1910. If the seller does decide to bind, seller response 110 is transmitted to central controller 200 at step 1920. At step 1930, ipCredits are removed from seller account 298 and placed in buyer account 297. At step 1940, the status of the counteroffer 140 is changed to "completed". Settlement confirmation 120 is transmitted to the buyer at step 1950 and transmitted to the seller at step 1960. Procedures for the exchange of credits are completed as described in FIG. 12.

Off-line Embodiment

In one embodiment of the present invention, buyer and seller communicate in an off-line manner with central controller 200. Rather than sending electronic mail or using web-based servers, buyers and sellers use a telephone, fax, postal mail or other off-line communications methods.

A seller may use a telephone, for example, to generate CPRC 100. The seller calls central controller 200 and is connected with an agent. The seller provides the terms of CPRC 100 such as subject, description of the credits, condition, expiration date, settlement requirements, etc. The seller also provides his seller ID password, or private key so that central controller 200 can authenticate his identity. The agent puts this data into digital form by typing it into a terminal and then adds legal language to form CPRC 100. CPRC 100 is then transmitted to central controller 200 where it is made available to potential buyers as described in the on-line embodiment.

In an alternative embodiment, the seller calls central controller 200 and is connected with a conventional Interactive Voice Response Unit (IVRU) which allows the seller to enter some or all of the terms of the CPRC 100 without the assistance of a live agent. The seller initially selects from a menu of subjects using the touch-tone keys of his telephone, and then the call is either directed to a live agent specializing in the subject are, or the seller is prompted for further terms in creating the CPRC 100.

Potential buyers may also use a telephone to browse and bind CPRCs 100. The potential buyer calls central controller 200 and selects a pollution credit subject. Central controller 200 then converts the text of each CPRC 100 into digital form, reading the text of each CPRC 100 into audio form, reading the entire list to the potential buyer. At any time during the reading of CPRCs 100, the potential buyer may press a combination of keys on his telephone to select a CPRC 100 for binding. The buyer enters buyers ID number and is authenticated by central controller 200 prior to binding o CPRC 100. Potential buyers would also enter parameters before having the list of CPRCs 100 read to them. A government official, for example, might need to browse many CPRCs 100 in order to accumulate sufficient ipCredits needed for clean air pollution offsets or counterbalances his agency requires.

Buyers may also communicate with an agent at central controller 200 through faxes or postal mail. The agent receives the message and proceeds to digitize it and form CPRC 100 as described above.

Anonymous Transaction Embodiment

As previously mentioned, the present invention provides for the anonymity of both sellers and buyers of pollution credits. Such anonymity is accomplished by eliminating all references to the names of the individuals for all transactions. A seller, for example, would include his ID in CPRC 100 rather than his name, preventing discovery of the seller's identity. This is desirable if the seller is for example, a food processor that did not want rivals to know the type of food processing equipment that the company was looking to sell pollution credits for.

In a similar manner, a buyer may also want to keep their identity a secret. For example, a sewage treatment facility within a large government agency might require anonymity from local over-sight committees until the pollution offset or counter-balance ipCredits was obtained and bound.

Although ID numbers can provide anonymity to both buyers and sellers, there are a number of potential weaknesses. First, if the database of ID numbers, stored in buyer database 260 or seller database 255, and their respective buyers/sellers identity is compromised, anonymity is destroyed since the message sender can be looked up in buyer database 260 or seller database 255. To prevent this from happening, the ID numbers are encrypted with the public key of central controller 200, so that even if it is stolen, it is useless without the private key.

Although we have described only one possible method for maintaining anonymity, there are other equivalents, for example, if the embodiment included telephone messaging, the identity of the seller and buyer could be maintained using conventional voice identification techniques. If CPRC 100 or seller response 110 were in paper form, the form could be scanned using optical character recognition and translated into digital form, discarding any information that could be found in the original document.

Trusted Server Embodiment

In one embodiment of the present invention, central controller 200 is separated into four distinct elements: operations server 160, trusted server 165, bonding agent 170, and ipCredit calculator 175. Each server performs a distinct task in the process of creating and managing CPRC 100. This separation makes it more difficult for attackers to compromise the system, as they must defeat the security of four separate systems instead of one.

Figure 20:
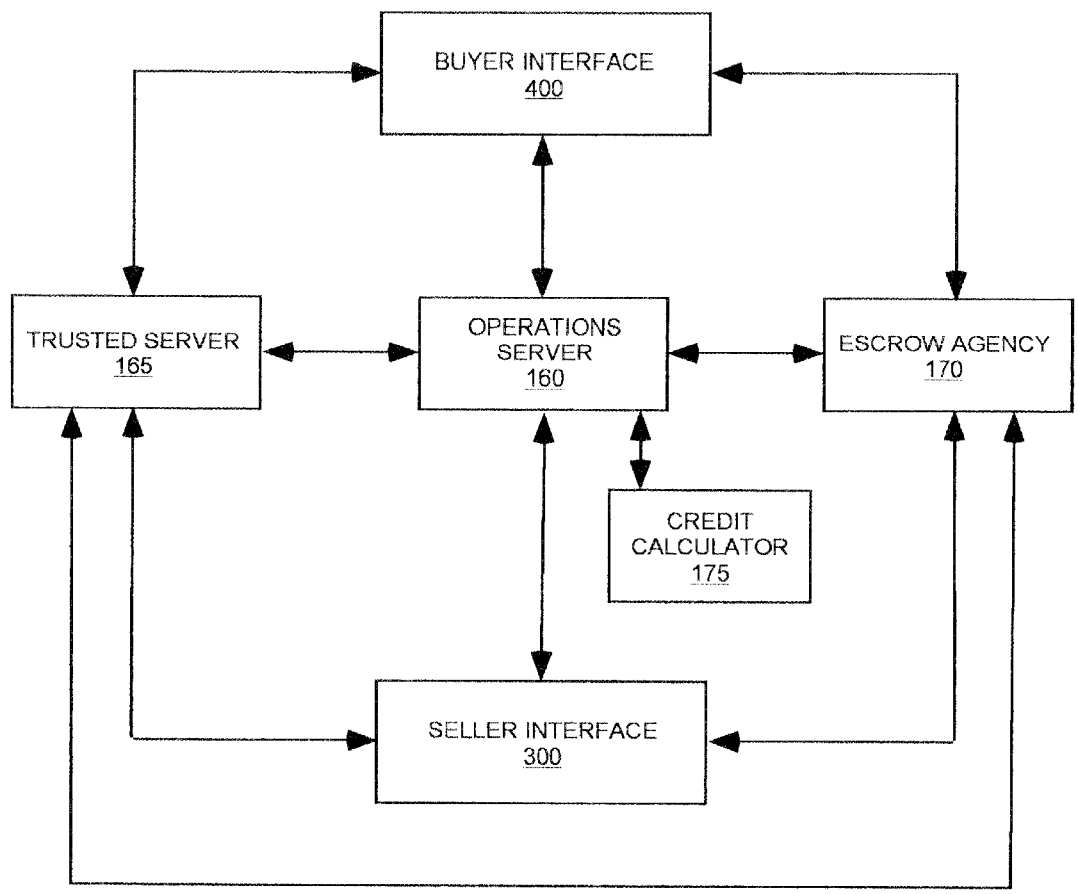
FIG. 20 illustrates an embodiment showing the use of a trusted server and a bonding agency.

FIG. 20 illustrates the process of the present invention, which allows these servers to work in conjunction with seller interface 300 and buyer interface 400. Operations server 160 has the task of posting CPRCs 100, and accepts all transactions previously authenticated by trusted server 165. Trusted server 165 authenticates the identity of the sellers and buyers, while bonding agent 170 verifies the ability of the sellers to pay for the service and the buyers to deliver on the sellers demands on bound CPRCs 100, while ipCredits calculator 175 calculates the pollution credit, which is a part of the CPRC 100, and communicates it's calculations to operations server 160. In this embodiment, each server type may be distributed over a number of servers.

The following protocols describe the interactions of the four servers and assume the following: (1) everyone knows the public keys of operations server 160, trusted server 165, bonding agent 170, and ipCredit calculator 175; (2) the seller and potential buyer have bond certificates 172, as discussed below; (3) public keys can be used both for encryption and for signing.

Before CPRC 100 is accepted by operations server 160, it must bear the digital signatures of trusted server 165, bonding agent 170 and ipCredits calculator 175. Because of this, CPRC 100 contains two additional elements, a trusted server ID and a bond certificate.

The trusted server ID is the ID number of the trusted server 165 which authenticated the seller who created CPRC 100. The "bond certificate" is a public key certificate, with the certifier (bonding agent 170 ) specifying a set of valid dates for bond certificate 172, a limit to the amount covered, a time limit when required, and a set of additional conditions. These additional conditions may require on-line checking of a revocation list, may specify operations server 160 and trusted server 165 to be used, etc. The private key corresponding to the public key certified is not known to the bonding agent 170—only to the user. Knowledge of that private key is used as proof of the identity for the bondholder. (This allows seller and buyer anonymity in many cases, though of course, neither will be anonymous to bonding agent 170 except in very special cases.) Bond certificate 172 for the buyer will be referred to as $BC_B$, while the corresponding public and private keys will be referred to as $PK_B$ and $SK_B$, respectively.

CPRC 100 is posted by an interaction between seller and buyer, trusted server 165, operations server 160. This part of the protocol is possible with nothing more than encrypted e-mail transmitted among the parties.

Before CPRC 100 may be posted, the seller must get approval from trusted server 165. This is required so that both seller and operations server 160 know that trusted serve 165 theyÕve designated to decide whether or not the contract has been fulfilled is actually willing to accept CPRC 100. Operations server 160 will not accept CPRC 100 without a TRUSTED_ACCEPTANCE message as described below.

The trusted server 165, in turn, will not issue a TRUSTED_ACCEPTANCE unless it is convinced that the seller's CPRC 100 is fresh (not a replay), and that the seller's ability to fulfill the requirements is guaranteed by bonding agent 170. The seller must also be convinced that he is being issued a fresh TRUSTED_ACCEPTANCE.

The protocol works as follows:
1. The seller forms $U_0$="REQUEST FOR TRUSTED APPROVAL"

$U_0=U_0$, CPRC,$R_0$, Additional Terms and sends to trusted server 165

$M_O=PKE_{PK_A}$ ($XO_O$, $Sign_{SK_S}$ (Xo)).

2. Trusted server 165 responds with $U_1$="TRUSTED CPRC CHALLENGE"

$R_1$=a 160-bit random number $X_1=U_1$ hash ($X_0$), $R_1$ and sends to the seller $M_1=PKE_{PK_S}$ ($X_1$, $Sign_{SK_A}$ ($X_1$)).

3. The seller responds to this with $U_2$="SELLER CPRC RESPONSE"

$X_2=U_2$, hash ($X_1$) and sends trusted server 165

$M_2=PKE_{PK_A}$ ($X_2$, $Sign_{SK_S}$ ($X_2$)).

4. Trusted server 165 responds with $U_3$="TRUSTED CPRC ACCEPTANCE"

$T_3$=Timestamp $X_3=U_3$, hash ($X_2$), $T_3$, CPRC and sends to the seller $M_3=PKE_{PK_S}$ ($X_3$, $Sign_{SK_A}$ ($X_3$)).

5. The seller stores $X_3$ as TRUSTED_ACCEPTANCE.

In order for operations server 160 to post CPRC 100, it must be convinced that CPRC 100 has a fresh TRUSTED_ACCEPTANCE, and that it is guaranteed by bonding agent 170. This works as follows:

1. The seller forms $R_0$=random 160-bit number

T=a time range $U_0$="CPRC Server Submission"

$X_0=U_0$, $R_0$, T, TRUSTED_ACCEPTANCE and then sends to operations server 160

$M_0=PKE_{PK_B}$ ($X_0$, $Sign_{SK_S}$ ($X_0$)).

2. Operations server 160 receives MO and verifies it. If it's fresh (not a replay), and if operations server 160 is willing to post CPRC 100, it forms $R_1$=a random 160-bit number $U_1$="SERVER CPRC CHALLENGE"

$X_1=U_1$, hash ($X_0$), $R_1$, and then encrypts and sends to the seller $M_1=PKE_{PK_S}$ ($X_1$, $Sign_{SK_B}$ ($X_1$)).

3. The seller forms $U_2$="CPRC RESPONSE TO SERVER CHALLENGE" and then sends to operations server 160

$M_2=PKE_{PK_B}$ ($X_2$, $Sign_{SK_S}$ ($X_2$)).

4. If this message has its signature verified properly, then operations server 160 posts the CPRC 100. Operations server 160 forms $U_3$="POSTED CPRC RECEIPT"

$CPO=U_3$, hash($X_2$), CPRC.

T=a time range (from first protocol message)

Then sends to the seller $M_3=PKE_{PK_S}$ (CPRC, $Sign_{SK_B}$ (CPRC)).

At the end of this protocol, the seller has a receipt to acknowledge that his CPRC 100 has been posted, and operations server 160 is convinced that the holder of bond certificate 172 has just agreed to CPRC 100, and has the approval of trusted server 165.

The potential buyer has a bonding certificate 172 ($BC_B$) of his own. Before he is allowed to browse CPRCs 100 in real time (with the ability to bind them), he must go through a protocol. (CPRCs 100 may be available to people who aren 0t browsing, but nobody is allowed to bind CPRCs 100 until they go through this protocol). The purpose of this protocol is to prove that the buyer is guaranteed by bonding agent 170 to be capable of delivering the required settlement, and also to decrease the computational load on operations server 160 by establishing a secret authentication key, $K_p$. All of this decreases the computational expense of allowing the potential buyer to browse CPRCs 100.

1. The potential buyer forms $R_0$=a random 160-bit number

T=a time range $U_0$=REQUEST FOR ACCESS TO BROWSE $X_0$=$U_0$, $R_0$, T, $BC_B$, and sends to operations server 160

$M_0$=$PKE_{PK_S}$ ($X_0$, $Sign_{SK_P}$ ($X_0$)).

2. Operations server 160 decides whether to grant the potential buyer access. If so, if forms $R_1$=a random 160-bit number $U_1$=SERVER BR0WSE-ACCESS CHALLENGE $X_1$=$U_1$, hash ($X_0$), $R_1$ and sends to the potential buyer $M_1$=$PKE_{PK_P}$ ($X_1$, $Sign_{SK_S}$ ($X_1$)).

3. The potential buyer responds by forming $U_2$=BROWSE-ACCESS RESPONSE and sends to operations server 160

$M_2$=$PKE_{PK_S}$ ($X_2$, $Sign_{SK_P}$ ($X_2$)).

4. Operations server 160 verifies the signature, and then responds by forming $U_3$=BINDING KEY $K_P$=a random secret key to be used for binding CPRCs 100.

T=a time range (from first protocol message)

$X_3$=$U_3$, hash ($X_2$), T, $K_P$, and sends to the potential buyer $M_3$=$PKE_{PK_P}$ ($X_{32}$, $Sign_{SK_S}$ ($X_3$)).

At the end of this protocol, the potential buyer holds the secret shared key with which he is allowed to bind CPRC 100, within time limits specified in the last message. The potential buyer and operations server 160 are both convinced that they have interacted with one another in real-time, and operations server 160 knows that the potential buyer's capacity to deliver on bound CPRC 100 are guaranteed by bonding agent 170.

As the potential buyer browses CPRCs 100, each is sent to him by operations server 160, authenticated under $K_P$, and including a random challenge to prevent replay attacks. When the potential buyer wants to one CPRC 100, he forms an offer to bind CPRC 100, and sends it, along with the hash of authenticated CPRC 100, authenticated under $K_P$. Operations server 160 is convinced that this is a valid offer to bind CPRC 100, and that it's happening in real time. It responds by sending him BOUND_CPRC.

1. Operations server 160 forms $U_0$=CPRC OFFER $R_0$=a random 160-bit number $X_0$=$U_0$, CPRC description and sends the potential buyer $M_0$=$PKE_{PK_P}$ ($X_0$, $Auth_{K_P}$ ($X_0$)). (Note that this step is repeated for each CPRC 100 browsed.)

2. The potential buyer forms $U_1$=CPRC OFFER TO BIND $R_1$=a random 160-bit number $X_1$=$U_1$, hash ($X_0$), $R_1$, Offer Details and encrypts and sends to operations server 160

$M_1$=$PKE_{PK_B}$ ($X_1$, $Auth_{K_P}$ ($X_1$)).

3. If the offer is accepted to operations server 160, then it forms $U_2$=SERVER BINDING OF CPRC T=time stamp $X_2$=$U_2$, hash ($X_1$), $BC_B$, T, CPRC, Offer Details and encrypts and sends to the potential buyer $M_2$=$PKE_{PK_P}$ ($X_2$, $Sign_{SK_B}$ ($X_2$)).

4. The potential buyer stores $X_2$, $Sign_{SK_B}$ ($X_2$) as BOUND_CPRC.

The Offer Details field BOUND_CPRC specifies the conditions of CPRC 100. In most cases, this will involve delivering some credits in exchange for payment, possibly in the presence of an agent from trusted server 165. In some cases however, this will involve intermediaries, to preserve anonymity for the potential buyer, the seller, or both, it is important that the potential buyer has the BOUND_CPRC so that he can prove his identify to the seller or intermediary with a simple challenge-response protocol.

This set of protocols describes one possible implementation of an infrastructure to support CPRCs 100. It is important to note that operations server 160, trusted server 165, and bonding agent 170 can conceivably be the same entity. In this case these protocols can be dramatically simplified. (Note that ipCredit calculator server 175 is not required for these buy/sell protocols.)

Barter Embodiment

Not all transactions require the transfer of money between seller and buyer. In a barter transaction the distinction between seller and buyer disappears, resulting in a contract between a first party and a second party. The first party posts CPRC 100, and the second party binds it. Instead of getting cash, the second party receives ipCredits from the first party. A first party who wanted to exchange ipCredits for improvements in a gas utility, for example, could post CPRC 100 in which he offered to exchange the ipCredit for a natural gas filter from the gas utility the buyer (government agency), franchises.

Arbitration Protocols

Although the previous embodiments have described the delivery of ipCredits from seller to buyer as a process of this invention, there will inevitably be disputes arising from some transactions, requiring follow-up activity to resolve these disputes. The present invention can support dispute-resolution in several ways. For example, language can be built into every CPRC 100 requiring that both parties submit to binding arbitration of all disputes, helping to avoid more costly and time consuming legal battles in a court of law. Additionally, liquidated damages may be set which specify damage amounts for particular infractions of CPRC 100. Also, central controller 200 can support the arbitration process by providing an arbiter for each dispute. Such arbitration might be required when a pollution credit settlement shipped from the buyer does not correspond to the CPRC 100. A seller seeking a gas filter be installed on the sellerÕs gas pipes by the local gas utility within the time period specified by law, for example, might seek damages against the local government agency that franchised the non-complying gas utility. Similarly, a small business owner (seller) whose CPRC 100 for OSHA compliance might seek damages from the gas utility and the local government agency for compromising the CPRC 100, and exposing him to sanctions from OSHA and his insurance provider, the local government agency (buyer) might seek to bring the offending utility into compliance with the law. In an arbitration involving ipCredit, the seller may submit a copy of the settlement offer to central controller 200 along with the tracking number of CPRC 100, allowing the arbiter to establish whether or not the buyer fulfilled the conditions CPRC 100. Sellers may also initiate arbitration proceedings if they have shipped ipCredits and have not yet received a settlement from the buyer.

In an alternative embodiment, transaction data can be sent to third party arbiters outside the system. Central controller 200 may send a copy of CPRC 100, seller response 110, and settlement confirmation 120 to the arbiters. Cryptographic keys may also be provided to the arbiters if there are questions of authenticity or non-repudiation.

Applications of the Invention

In order to clarify applications of the present invention, the following examples demonstrate potential requirements of individual pollution reduction credit (CPRC 100 ) owners:

CPRC: Polychlorinated Biphenyl (PCB) ipCredits

Reimbursement of all medical bills related to PCB exposure from to using contaminated gas indoors including cancer, birth defects and reproductive harm by local gas utility.

- Utility makes funds available for all past medical bills,
- Utility must make funds available for all future medical bills,
- Must provide a signed contract attesting to acceptance,
- Must accept terms in 30 calendar days,
- Gifting of the ipCredits to a local city government,
- Binding contract if utility complies with requirements, CPRC: Nitrogen Oxide (NOx) ipCredit
- Gas filter needed on home gas pipes
- From local gas utility
- Utility covers cost of installation
- Gas filter disposal is the utility's responsibility
- Must accept terms in 10 working days
- Possible gifting of the ipCredits to local city government
- Binding contract if utility complies with requirements CPRC: Sulfur Dioxide (SO2) ipCredits
- Seismic gas shut off valve needed on home gas pipes
- From local gas utility
- Utility covers cost of installation
- Utility provides product certification for home owner's insurance carrier
- On-going service is the utility's responsibility
- Must accept terms in 10 working days
- Possible gifting of the ipCredits to local city government
- Binding contract if utility complies with requirements CPRC: Particulate Matter ipCredits
- Gas surge shut off mechanism needed on home gas pipes
- From local gas utility
- Utility covers cost of installation
- Utility provides product certification for home owner's insurance carrier
- On-going service is the utility's responsibility
- Must accept terms in 10 working days
- Possible gifting of the ipCredits to local city government
- Binding contract if utility complies with requirements CPRC: Total Organic Compounds (TOC) ipCredits
- Remeadiation of all interior surfaces contaminated with natural gas combustion byproducts
- By local gas utility
- Utility covers all remeadiation costs
- Utility provides certification for my home owner's insurance carrier
- Must provide a signed contract with licensed building contractor covering time, materials, labor and taxes
- Must accept terms in 30 calendar days
- Possible gifting of the ipCredits to local city government
- Binding contract if utility complies with requirements CPRC: Carbon Monoxide ipCredits
- Gas filter needed on piazza parlor gas pipes
- From local gas utility
- Utility must acquire compliance acceptance from local OSHA field office for Proposition 65 compliance
- Utility provides product certification for the business owner's insurance carrier
- Utility covers cost of installation
- Gas filter disposal is the utility's responsibility
- Must accept terms in 15 working days
- Possible gifting of the ipCredits to local city government
- Binding contract if utility complies with requirements Those skilled in the art will recognize that the method and apparatus of the present invention has many applications, including drinking water, electric power, telephony, and wireless communications, and that the present invention is not limited to the representative examples disclosed herein. Moreover, the scope of the present invention covers components described herein, as would be known by those skilled in the art.

What is claimed is:

1. A data processing apparatus for establishing one of a pollution offset and tax offset, for a seller using gas within gas distribution system of a home, business or the like, to bring about a reduction of known pollutants being emitted into the atmosphere associated with said seller's home, business or the like, on a day-to-day basis or on a catastrophic basis, comprising:

(a) a central controller including a CPU and a memory operatively connected to said CPU, (b) at least one terminal adapted for communicating with said central controller for transmitting thereto, pollution credit or tax credit information to gain a conditional pollution reduction credit ("CPRC") for said seller, (c) said memory containing a program adapted to be executed by said CPU for 1) authenticating legal basis of the energy efficiency means employed against a data base of eligible energy efficiency means, (2) authenticating the eligibility of the seller against a data base of eligible sellers, (3) if the energy efficiency means relates to non-filtering of pollutants, generating a CPRC for tax credit offset purposes for said seller as a function of a seller identifier, (4) if the energy efficiency means relates to filtering of pollutants, determining the eligibility of each pollutant against a pollutant data base, (5) determining the amounts of reduction of each eligible pollutant normalized to a standard time duration; (6) generating a CPRC for each pollutant based on (5), and (7) storing each CPRC generating at (3) and (6) as a function of a seller identifier which may include a seller's credit card number, whereby economic incentive has been provided to said seller to bring about a substantial reduction of emission of pollutants to the atmosphere whether on a day-to-day basis or on a catastrophic basis.

2. The apparatus of claim 1 wherein same program is adapted to perform a credit card transaction to pay for the establishment of said CPRC for said seller.

3. The apparatus of claim 1 wherein said program is adapted to transfer said CPRC to a third party based on selected transfer criteria via said at least one terminal or a like terminal connected to said central controller.

4. The apparatus of claim 3 wherein said program is adapted to:transfer said CPRC to a governmental agency as a gift via said at least one terminal or a like terminal connected to said central controller.

5. The apparatus of claim 3 wherein said program is adapted to transfer said CPRC on a cash or credit basis to a third person via said at least one terminal or a like terminal connected to said central controller.

6. The apparatus of claim 5 wherein said program is adapted to authenticate a buyer against a buyer data base and to identify his method of payment using a payment identifier code via said at one terminal or a like terminal connected to said central controller to transfer an offer from said buyer to said seller via said at least one terminal or a like terminal connected to said central controller, to transfer acceptance from the seller to the buyer and to transfer payment to said seller from said buyer using said payment identifier code.

7. The apparatus of claim 1 wherein the gas is natural gas.

8. The apparatus of claim 1 wherein the gas is propane.

9. A method for establishing one of a pollution offset and tax offset, for a seller using gas within gas distribution system of a home, business or the like, to bring about a reduction of known pollutants being emitted into the atmosphere associated with said seller's home, business or the like, on a day-to-day basis or on a catastrophic basis, using a central controller including a CPU and a memory operatively connected to said CPU and containing a-program adapted to generate a conditional pollution reduction credit (CPRC"), and at least one terminal adapted for communicating with said central controller for transmitting thereto, pollution credit or tax credit information of said seller, comprising the steps of:

(1) inputting seller type associated with a given energy efficiency means employed to the controller via the terminal, (2) authenticating eligibility of (i) by executing the program residing within the central controller, (3) if the energy efficiency means and seller type relate to non-filtering of pollutants, generating a CPRC for tax credit offset purposes for said seller as a function of a seller identifier, (4) if the energy efficiency means relates to filtering of pollutants, determining the eligibility of each pollutant against a pollutant data base, (5) determining the amounts of reduction of each eligible pollutant normalized to a standard time duration; (6) generating a CPRC for each pollutant based on (5), and (7) storing each CPRC generating at (3) and (6) as a function of a seller identifier which may include a seller's credit card number whereby economic incentive has been provided to said seller to bring about a substantial reduction of emission of pollutants to the atmosphere whether on a day-to-day basis or on a catastrophic basis.

10. The method of claim 9 including the precursor step of inputting a seller credit card number to said central controller via said terminal and wherein same program is adapted to perform a credit card transaction to pay for the establishment of said CPRC for said seller.

11. The method of claim 9 wherein said program is adapted to output said CPRC to a third party based on selected transfer criteria via said at least one terminal or a like terminal.

12. The method of claim 11 wherein said program is adapted to transfer said CPRC to a governmental agency as a gift.

13. The method of claim 11 wherein said program is adapted to transfer said CPRC on a cash or credit basis to a third party via said at least one terminal or another terminal connected to said central controller.

14. The method of claim 13 wherein said program is adapted to input to the central controller buyer criteria so as to authenticate a buyer against a buyer data base and to identify his method of payment via said at one terminal or a like terminal connected to said central controller, to transfer an offer from said buyer to said seller via said at least one terminal or a like terminal connected to said central controller, to transfer acceptance from the seller to the buyer and to transfer payment to said seller from said buyer using said payment identifier code.

15. The method of claim 9 wherein the gas is natural gas.

16. The method of claim 9 wherein the gas is propane.

* * * * *